(12) United States Patent
Krishnan et al.

(10) Patent No.: US 11,244,400 B1
(45) Date of Patent: *Feb. 8, 2022

(54) REPRESENTING INVESTMENT OPTIONS AS TRAVEL OPTIONS ON A MAP

(71) Applicant: Wells Fargo Bank, N.A., San Francisco, CA (US)

(72) Inventors: Gothandapani Krishnan, Bangalore (IN); Madeshwaran Mohanraj, Salem (IN); Jayakrishna Nair, Bangalore (IN); Kalyan Chandra Kothamasu, Bangalore (IN); Ramanathan Ramanathan, Bellevue, WA (US); Rameshchandra Bhaskar Ketharaju, Hyderabad (IN); Shanmukeswara Rao Donkada, Hyderabad (IN); Parthasarathy Venkatesan, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/846,919

(22) Filed: Apr. 13, 2020

Related U.S. Application Data

(63) Continuation of application No. 15/371,399, filed on Dec. 7, 2016, now Pat. No. 10,621,668.

(51) Int. Cl.
*G06Q 40/06* (2012.01)
*G06F 16/29* (2019.01)
(Continued)

(52) U.S. Cl.
CPC ............ *G06Q 40/06* (2013.01); *G06F 16/29* (2019.01); *G06Q 10/025* (2013.01); *G06Q 30/02* (2013.01)

(58) Field of Classification Search
None
See application file for complete search history.

(56) References Cited

U.S. PATENT DOCUMENTS

| 5,948,040 A | 9/1999 | Delorme et al. |
| 6,064,984 A | 5/2000 | Ferguson et al. |

(Continued)

OTHER PUBLICATIONS

Ge, Shuzhi, "Simultaneous Path Planning and Topological Mapping (SP2ATM) for environment exploration and goal oriented navigation", Robotics and Autonomous Systems, vol. 59 Issues 3-4 Mar.-Apr. 2011. (Year: 2011).*

(Continued)

*Primary Examiner* — Abdulmajeed Aziz
(74) *Attorney, Agent, or Firm* — Shumaker & Sieffert, P.A.

(57) ABSTRACT

This disclosure is directed to techniques that include presenting various investment options in a graphical representation of a map. In one example, a method includes collecting information about a user; determining a geographical area expected to be familiar to the user; outputting a map illustrating a plurality of travel plans within the geographical area, each travel plan being associated with an investment option, and wherein the map illustrates each of the travel plans with a travel vehicle corresponding to an investment vehicle and a travel time corresponding to an investment timeframe; receiving an indication of input interacting with the map; identifying a selected travel plan from among the plurality of travel plans within the geographical area; and determining a selected investment option, wherein the selected investment option is the investment option associated with selected travel plan.

18 Claims, 12 Drawing Sheets

(51) Int. Cl.
*G06Q 30/02* (2012.01)
*G06Q 10/02* (2012.01)

(56) References Cited

U.S. PATENT DOCUMENTS

| | | | |
|---|---|---|---|
| 6,078,904 A | 6/2000 | Rebane | |
| 7,617,136 B1 | 11/2009 | Lessing et al. | |
| 8,407,099 B1 | 3/2013 | Frank et al. | |
| 9,558,210 B1* | 1/2017 | Tomkins | G06F 16/29 |
| 10,621,668 B1 | 4/2020 | Krishnan et al. | |
| 2002/0156661 A1* | 10/2002 | Jones | G06Q 30/0601 |
| | | | 705/6 |
| 2005/0010516 A1* | 1/2005 | Ivanov | G06Q 40/06 |
| | | | 705/36 R |
| 2008/0201227 A1 | 8/2008 | Bakewell et al. | |
| 2011/0046881 A1 | 2/2011 | Karaoguz | |
| 2011/0107265 A1* | 5/2011 | Buchanan | G06Q 40/02 |
| | | | 715/835 |
| 2011/0112908 A1 | 5/2011 | Rowley et al. | |
| 2013/0325659 A1* | 12/2013 | Shekher | G06Q 30/0639 |
| | | | 705/26.9 |
| 2014/0067634 A1 | 3/2014 | Sowder et al. | |
| 2014/0089101 A1 | 3/2014 | Meller | |
| 2014/0172576 A1 | 6/2014 | Spears et al. | |
| 2015/0046085 A1* | 2/2015 | Gornisiewicz | G01C 21/3415 |
| | | | 701/519 |
| 2015/0052080 A1* | 2/2015 | Letzeiser | G06F 3/0488 |
| | | | 705/36 R |
| 2015/0066683 A1* | 3/2015 | Azose | G01C 21/3423 |
| | | | 705/26.7 |
| 2016/0063631 A1 | 3/2016 | Wootton et al. | |
| 2016/0298977 A1* | 10/2016 | Newlin | G01C 21/20 |
| 2017/0336221 A1 | 11/2017 | Salowitz et al. | |
| 2018/0158142 A1* | 6/2018 | Gunther | G06Q 40/04 |

OTHER PUBLICATIONS

Long, Duke "Rescour: Automated Market Research for Commercial Real Estate Professionals", Aug. 2, 2015, 11 pages.
Prosecution History from U.S. Appl. No. 15/371,399, dated Sep. 19, 2018 through Mar. 9, 2020, 178 pp.

* cited by examiner

REPRESENTING INVESTMENT OPTIONS AS TRAVEL OPTIONS ON A MAP

CROSS REFERENCE

This application is a continuation application of and claims priority to U.S. patent application Ser. No. 15/371,399 filed on Dec. 7, 2016, which is hereby incorporated by reference herein in its entirety.

BACKGROUND

Financial investors have many choices for investment, and choosing from among the many different investments available may require significant knowledge. Often, investors do not have enough investment knowledge to make well-informed decisions.

SUMMARY

This disclosure is directed to techniques that include presenting various investment options in a graphical representation of a map. In some examples, a computing system may present investment options as travel options between two cities. Often, people are more familiar with making decisions about travel options than about investment options. By presenting investment options in terms of travel plans, a computing system may enable investors to make more informed decisions. In some examples, travel plans are presented to a user in terms of geographical areas, starting locations, and destination locations that are familiar to the user.

A computing system may receive input relating to an investment goal along with parameters or constraints relating to the investment. The computing system may determine multiple investment options for achieving the goal, and may determine travel plans corresponding to each investment option. A computing system may detect selection of one of the travel plans, and in response, may initiate, on the user's behalf, an investment corresponding to the selected plan.

In one example, a method comprises: collecting, by a computing system, information about a user; determining, by the computing system and based on the collected information, a geographical area expected to be familiar to the user; outputting, by a computing system for presentation on a display screen, a map illustrating a plurality of travel plans within the geographical area, each travel plan being associated with an investment option, and wherein the map illustrates each of the travel plans with a travel vehicle corresponding to an investment vehicle and a travel time corresponding to an investment timeframe; receiving, by the computing system, an indication of input interacting with the map; identifying, by the computing system and based on the indication of input, a selected travel plan from among the plurality of travel plans within the geographical area; and determining, by the computing system and based on the indication of input, a selected investment option, wherein the selected investment option is the investment option associated with selected travel plan.

In another example, a computing system comprises a storage system and processing circuitry, wherein the processing circuitry is configured to perform operations comprising: collecting information about a user; determining, based on the collected information, a geographical area expected to be familiar to the user; outputting, for presentation on a display screen, a map illustrating a plurality of travel plans within the geographical area, each travel plan being associated with an investment option, and wherein the map illustrates each of the travel plans with a travel vehicle corresponding to an investment vehicle and a travel time corresponding to an investment timeframe; receiving an indication of input interacting with the map; identifying, based on the indication of input, a selected travel plan from among the plurality of travel plans within the geographical area; and determining, based on the indication of input, a selected investment option, wherein the selected investment option is the investment option associated with selected travel plan:

In another example, a computer-readable storage medium comprising instructions that, when executed, configure at least one processor of a computing system to: collecting information about a user; determining, based on the collected information, a geographical area expected to be familiar to the user; outputting, on a display screen, a map illustrating a plurality of travel plans within the geographical area, each travel plan being associated with an investment option, and wherein the map illustrates each of the travel plans with a travel vehicle corresponding to an investment vehicle and a travel time corresponding to an investment timeframe; receiving an indication of input interacting with the map; identifying, based on the indication of input, a selected travel plan from among the plurality of travel plans within the geographical area; and determining, based on the indication of input, a selected investment option, wherein the selected investment option is the investment option associated with selected travel plan.

DETAILED DESCRIPTION

Figure 1:
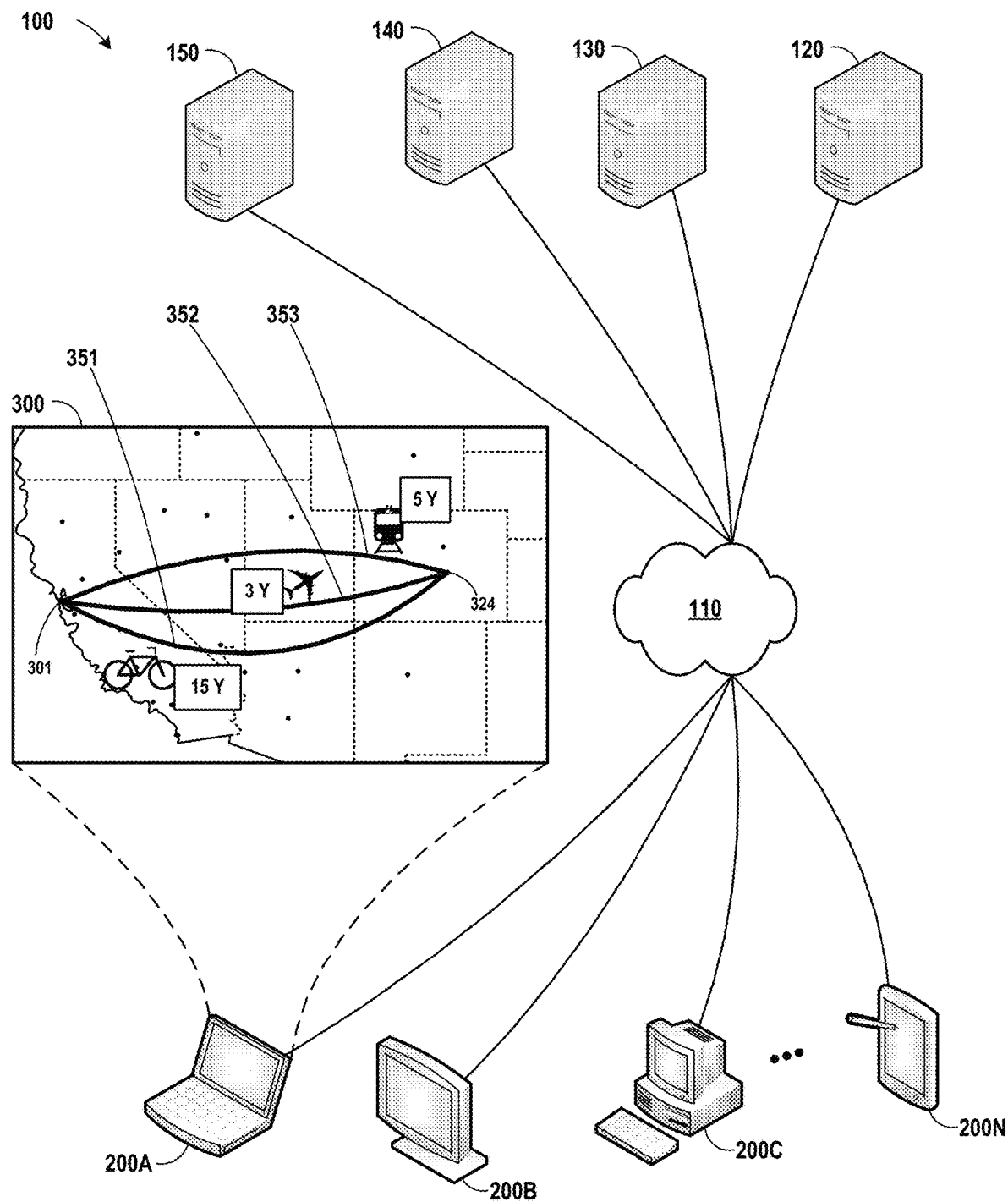
FIG. 1 is a conceptual diagram illustrating an example system for presenting investment options in a graphical representation of a map, in accordance with one or more aspects of the present disclosure.

FIG. 1 is a conceptual diagram illustrating an example system for presenting investment options in a graphical representation of a map, in accordance with one or more aspects of the present disclosure. In the example of FIG. 1, system 100 includes one or more computing devices 200 in communication, via network 110, with one or more financial institution systems 120, one or more prediction analytics systems 130, one or more mapping service systems 140, and/or one or more investment markets 150. Computing devices 200 may include computing device 200A through computing device 200N (collectively referred to as "computing devices 200").

Network 110 may be the internet, or may represent any public or private communications network, for instance, cellular, Wi-Fi, and/or other types of networks, for transmitting data between computing systems, servers, and computing devices. Network 110 may include one or more network hubs, network switches, network routers, or any other network equipment, that are operatively inter-coupled thereby providing for the exchange of information between computers, devices, or other components (e.g., between one or more server devices and one or more computing devices 200). One or more of financial institution system 120, prediction analytics system 130, mapping service system 140, investment market 150, computing devices 200, or other systems or devices may transmit and receive data, control signals, commands, and/or other information across network 110 using any suitable communication techniques. Computing devices 200, financial institution system 120, prediction analytics system 130, mapping service system 140, and investment market 150, may each be operatively coupled to network 110 using one or more network links. The links coupling devices and/or systems to network 110 may be Ethernet, ATM or other types of network connections, and such connections may be wireless and/or wired connections.

Each of computing devices 200 may be implemented through an individual mobile or non-mobile device, such as a mobile phone, a tablet computer, a laptop or desktop computer, computerized watch, computerized eyewear, computerized glove or gloves, or any other type of mobile or non-mobile computing device. Additional examples include personal digital assistants (PDAs), gaming systems, media players, e-book readers, television platforms, automobile navigation and entertainment (e.g., infotainment) systems, or any other type of mobile or non-mobile, wearable and non-wearable computing devices configured to receive information via a network, such as network 110.

Each of computing devices 200 may serve as a computing device that enables a user to interact with, browse, and/or use information or resources available over network 110 or otherwise provided by system 100. For instance, each of computing devices 200 may, at the direction of a user, perform one or more searches for information, monitor or check or process the user's personal communications, perform a task, or access other information or resources. Each of computing devices 200 may receive investment information, information about investment options, and/or information about investment performance.

Although computing devices 200 may be illustrated or described in FIG. 1 or elsewhere as similar devices, one or more of computing devices 200 may be different from others, and may be implemented through widely diverse hardware, software, and other components. In some examples, some of computing devices 200 may be implemented as one or more smartphones, some of computing devices 200 may be implemented as one or more tablet devices, and some of computing devices 200 may be implemented as other types of devices. Many implementations are possible. Further, some of computing devices 200 may include hardware, modules, software and/or functionality not found in other computing devices 200.

Financial institution system 120, prediction analytics system 130, and mapping service system 140 may each be implemented through any suitable computing system, such as one or more server computers, desktop computers, laptop computers, mainframes, appliances, cloud computing systems, etc. capable of sending and receiving information both to and from a network, such as network 110. Although each of financial institution system 120, prediction analytics system 130, and mapping service system 140 may be illustrated as a stand-alone device in FIG. 1, each of financial institution system 120, prediction analytics system 130, and mapping service system 140 may, generally, take many forms, and may be, or may be part of, any component, device, or system that includes a processor or other suitable computing environment for processing information or executing software instructions. Each of financial institution system 120, prediction analytics system 130, and mapping service system 140 may be distributed across one or more computing systems, and/or one or more of financial institution system 120, prediction analytics system 130, and mapping service system 140 may be combined into a single system.

In some examples, each of financial institution system 120, prediction analytics system 130, and mapping service system 140 may represent a cloud computing system that provides services to client devices and other devices or systems. For example, each of financial institution system 120, prediction analytics system 130, and mapping service system 140 may host or provide access to services of financial institution system 120, prediction analytics system 130, and/or mapping service system 140. Each of financial institution system 120, prediction analytics system 130, mapping service system 140, and/or computing devices 200 may communicate with financial institution system 120, prediction analytics system 130, and mapping service system 140 over network 110 to access services provided by one or more modules of financial institution system 120, prediction analytics system 130, and mapping service system 140.

For example, financial institution system 120 may provide investment services to one or more operators of computing devices 200. Financial institution system 120 may collate some or all investments for a user, corporate entity, investment fund, or institution. Financial institution system 120 may output to one or more computing devices 200 investment options or proposals, and financial institution system 120 may receive from one or more computing devices 200 instructions to invest funds in one or more investment options or proposals.

Prediction analytics system 130 may perform analytical services for financial institution system 120 or for one or more systems or devices within system 100. Prediction analytics system 130 may receive investment parameters, investment constraints, and/or information about an investment, and may perform an analysis and output investment options and proposals. Prediction analytics system 130 may employ Bayesian statistics, Markov chain models, and other analytical tools for prediction of market movements. Prediction analytics system 130 may analyze maps, graphs, and/or investment options in terms of directed acyclic graphs. Prediction analytics system 130 may determine the optimal route between two cities on a map representing one or more investment options, based on travel time and vehicle options and choices.

Mapping service system 140 may perform or provide services relating to maps, travel plans, or travel information. Mapping service system 140 may receive information or a request relating to a travel path, a travel plan, and/or geographical parameters. Mapping service system 140 may analyze such information, and output mapping, travel, or geographical information. For example, mapping service system 140 may provide satellite imagery, street maps, 360° panoramic views of streets, real-time traffic conditions, and route planning for traveling by air, boat, train, bus, car, bicycle, foot, or other transportation. Mapping service system 140 may expose an API interface providing access to mapping functions to computing devices 200, financial institution system 120, or other devices. In some examples, mapping service system 140 may be the Google Maps service provided by Google Inc.

Investment market 150 may include any market (e.g., stock market, futures market, bond market, options market, equity market, share market) that may include an aggregation of buyers and sellers of investment securities, including, but not limited to, stocks, bonds, mutual funds, futures, options, commodities, swaps, debt instruments, or any other asset, security, or instrument that may be used for investment. Investment market 150 may include, but is not limited to, the New York Stock Exchange, NASDAQ, NYSE MKT LLC, BATS Global Markets, IEX, the London Stock Exchange Group, the Japan Exchange Group, Euronext, the Chicago Board of Trade, the Chicago Mercantile Exchange, the New York Mercantile Exchange, the Tokyo Commodity Exchange, and others. Investment market 150 may include one or more clearing houses that provide clearing and settlement services for financial and commodities derivatives and securities transactions executed on, for example, a futures exchange or securities exchange, as well as off-exchange in, for example, the over-the-counter (OTC) market.

One or more computing devices 200 may present one or more user interfaces 300. In the example of FIG. 1, user interface 300 illustrates multiple investment options presented as travel options on a map, in accordance with one or more aspects of the present disclosure. The investment options presented in user interface 300 illustrate paths (investment option travel path 351, investment option travel path 352, investment option travel path 353) from staring city San Francisco 301 to destination city Denver 324. Each travel path in the example of user interface 300 is associated with one or more travel vehicles, which may correspond to one or more investment vehicles.

In the example of FIG. 1, and in accordance with one or more aspects of the present disclosure, financial institution system 120 may authenticate the user operating computing device 200A. For example, computing device 200A may detect input that it determines corresponds to a request to access content or services at financial institution system 120. Computing device 200A may send a request over network 110 to financial institution system 120. Financial institution system 120 may respond to the request by sending over network 110 information sufficient to present a user interface (e.g., a web page) at computing device 200A. Computing device 200A may receive the information, and present a user interface at computing device 200A. Computing device 200 may detect input that it determines corresponds to authentication credentials, such as a username and password, associated with an account established at financial institution system 120. Computing device 200A may send the authentication credentials over network 110 to financial institution system 120. Financial institution system 120 may, based on the authentication credentials, identify a user account. Financial institution system 120 may authenticate or confirm the identity of the user at computing device 200A (e.g., by verifying the password or by performing other actions). Financial institution system 120 may establish a session for the authenticated user at computing device 200A.

Financial institution system 120 may determine investment options, based on input detected by computing device 200A. For example, computing device 200A may detect input that it determines corresponds to investment parameters or investment constraints. The investment parameters may include an initial investment, a goal investment, and a timeframe for reaching the goal investment. Computing device 200A may transmit this information over network 110. Financial institution system 120 may detect input over network 110 that it determines corresponds to the investment parameters from computing device 200A. Financial institution system 120 may output to prediction analytics system 130, over network 110, information about the investment parameters. Prediction analytics system 130 may generate one or more investment options responsive to or consistent with the investment parameters. The investment options may include predicted investment results and predicted timeframes for achieving the results. Prediction analytics system 130 may output to financial institution system 120, over network 110, information about the investment options. Financial institution system 120 may receive the information about the investment options from prediction analytics system 130.

Financial institution system 120 may determine mapping information corresponding to one or more investment options. For example, financial institution system 120 may output to mapping service system 140, over network 110, a request for map information. Mapping service system 140 may receive the request, and respond to financial institution system 120 by sending, over network 110, to financial institution system 120, map information. Financial institution system 120 may generate travel options that correspond to the information about the investment options.

Computing device 200A may generate a user interface that presents the investment options as travel options. For example, financial institution system 120 may output, over network 110, the information about the travel options corresponding to the investment options. Computing device 200A may receive input over network 110 and determine that the input corresponds to travel option information that can be used to generate a user interface. Computing device 200 may, based on this information, generate user interface 300, and cause user interface 300 to be presented at computing device 200A. In the example of FIG. 1, user interface 300 includes investment option travel path 351, investment option travel path 352, and investment option travel path 353.

In some examples, computing device 200A may retrieve map information from 140 directly when generating user interface 300. In such examples, it may be unnecessary for financial institution system 120 to request, from mapping service system 140, map information corresponding to one or more investment options.

Computing device 200A may cause an investment corresponding to investment option travel path 352 to be initiated. For example, computing device 200A may detect input that it determines corresponds to selection of investment option travel path 352. Responsive to this input, computing device 200A may present a user interface or dialog requesting confirmation of an investment corresponding to investment option travel path 352. Computing device 200A may detect input that it determines corresponds to confirmation. Computing device 200A may send, over network 110, to financial institution system 120, a request to make an investment corresponding to investment option travel path 352. Financial institution system 120 may receive the request and output to investment market 150 a request to make an investment on behalf of the authenticated user at computing device 200A. Investment market 150 may initiate the investment, and respond to financial institution system 120 with a confirmation of the investment. Financial institution system 120 may receive the confirmation and update one or more accounts at financial institution system 120 associated with the authenticated user operating computing device 200A. Financial institution system 120 may send a confirmation over network 110 to computing device 200A, informing a user at computing device 200A that the investment was made.

In user interface 300 of FIG. 1, investment option travel path 351, investment option travel path 352, and investment option travel path 353 each represent a travel path corresponding to an investment plan. Investment option travel path 351, investment option travel path 352, and investment option travel path 353 are presented as travel plans for traveling from San Francisco 301 to Denver 324. The predicted times to reach an investment goal may be included in user interface 300. For example, investment option travel path 351 is expected to take fifteen years to reach the investment goal at Denver 324, investment option travel path 352 is expected to take three years, and investment option travel path 353 is expected to take five years to reach Denver 324. In the example of FIG. 1, each travel plan is illustrated as corresponding to one mode of transportation (bicycle, airplane, train). In other examples, one or more of path 354, path 355, path 356, and path 357 might include more than one mode of transportation.

Financial institution system 120 (or computing device 200A) may choose, configure, or design the map presented within user interface 300 so that it represents an area of the world familiar to a user. Financial institution system 120 may receive, possibly over the course of a long period of time, information that suggests familiarity with a geographical region. For example, financial institution system 120 may receive information about user's home address, business address, assets, investments, beneficiaries, browsing history, search history, and/or travel history. Financial institution system 120 may determine, based on this information, that a user may be familiar with the western portion of the United States. Accordingly, the cities, travel distances, and paths illustrated in FIG. 1 may be chosen so that they are familiar to the user.

Presentation of investment options as modes of travel may aid in understanding various investment options. For example, an airplane flight might represent a relatively high reward but high risk investment, such as a sector-based equity investment. Traveling by train (e.g., high speed train) may represent a relatively high reward and high risk investment, but one that may be generally less high reward and high risk than an investment represented by air travel. For example, an investment corresponding to the train mode of travel might involve a mutual fund that invests in an equity index fund, or a diverse group of equities, or an equity fund with some degree of bond diversification. Travel by automobile or bus might correspond to bond investments, debt investments, or fixed deposit or certificate of deposit investments. Travel by bicycle might correspond to investment in safe, but slow-moving investments, such as treasury bills, treasury bonds, or an insured bank savings account.

These or other modes of travel, and how they correspond to investment options, may be chosen so that a user's intuitive understanding of travel options represent appropriately corresponding investment options. Many people have an intuitive understanding of and significant experience relating to differences between different modes of travel, and presenting investment options in terms of modes of travel and travel plans may enable investors to understand implications of different investment options. Effectively presenting investment options as travel paths or travel plans may leverage common understandings about travel, travel paths, modes of travel, and may make investment choices and concepts more intuitive, accessible, approachable, and understandable.

By presenting investment options as travel options on a map, in a manner consistent with one or more aspects of the present disclosure, system 100 may more effectively present investment options in a manner easily understood by investors. As a result, investors may be able to effectively use a computing device to invest without understanding complicated or nuanced finance concepts. That is, in at least some examples, the techniques of this disclosure may improve the function of a display function of the computing device itself, as the computing device displays investment information in a more efficient manner. Hence, investors may find investing accessible enough to make effective investments without spending as much time using a computing device to research and analyze different investment options. If at least some investors spend less time using a computing device researching and analyzing investments, one or more devices of system 100 may perform less computing and network operations. If one or more devices perform less computing operations, those devices may consume less electrical power. Also, if one or more devices of system 100 perform less networking operations, those devices may have less of an impact on network bandwidth or congestion.

Figure 2:
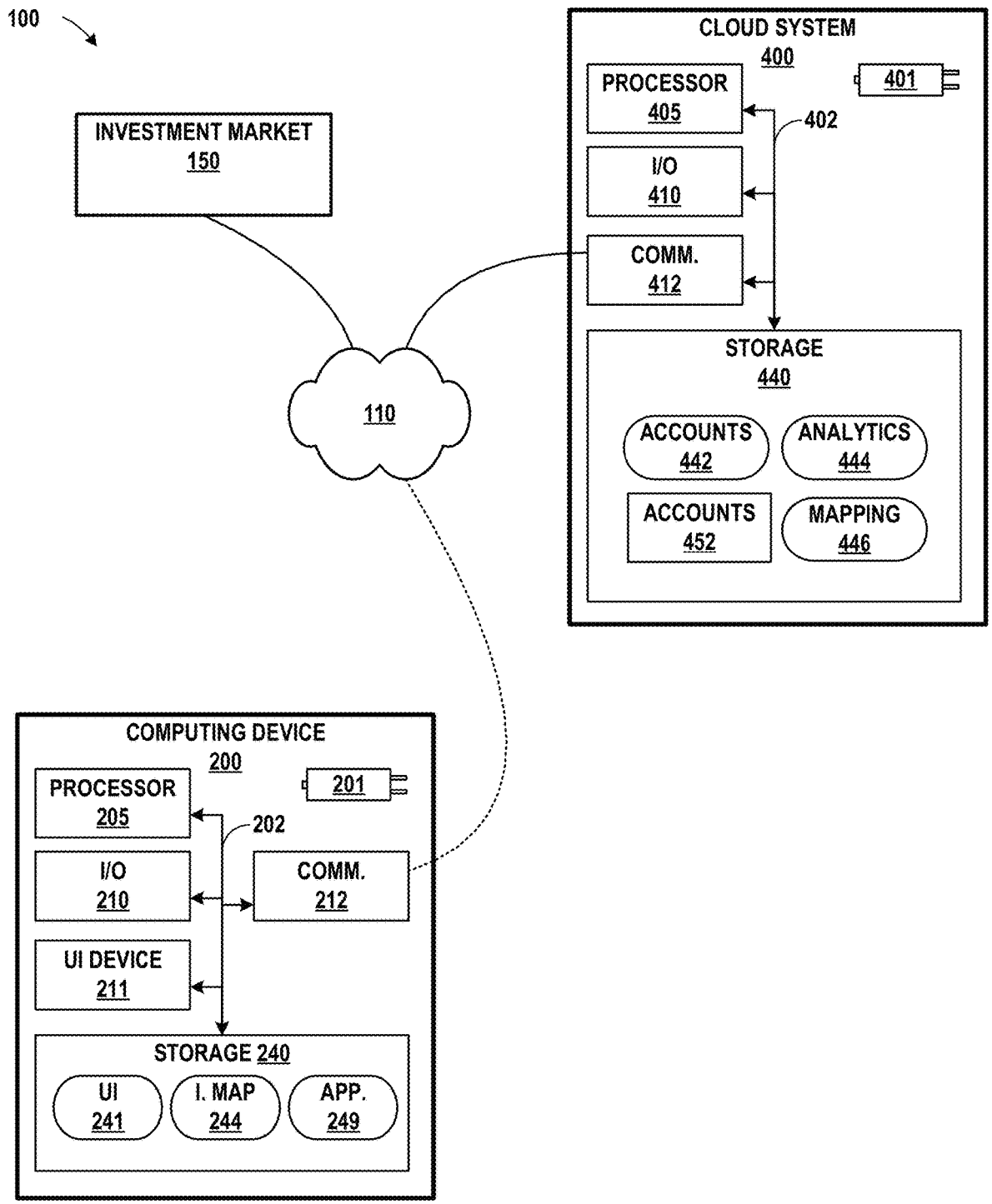
FIG. 2 is a block diagram illustrating an example system for presenting investment options in a graphical representation of a map, in accordance with one or more aspects of the present disclosure.

FIG. 2 is a block diagram illustrating an example system for presenting investment options in a graphical representation of a map, in accordance with one or more aspects of the present disclosure. System 100 of FIG. 2 is described below as an example or alternate implementation of system 100 of FIG. 1. FIG. 2 illustrates one example or alternate implementation of system 100, and other example or alternate implementations of system 100 may be used or may be appropriate in other instances. Such implementations may include a subset of the components included in the example of FIG. 2 and/or may include additional components not shown in FIG. 2. In the example of FIG. 2, system 100 includes cloud system 400, computing device 200, network 110, and investment market 150.

In some examples described herein, certain operations, techniques, features, and/or functions may be described as performed by one or more components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not described herein in such a manner. For example, one or more functions described as being performed by cloud system 400 may alternatively or in addition be performed by one or more computing devices 200.

Network 110 and investment market 150 may be implemented in a manner consistent with the description provided in connection with FIG. 1, and may include the same capabilities, more capabilities, fewer capabilities, or different capabilities as those described in connection with FIG. 1 or described elsewhere herein.

Cloud system 400 of FIG. 1 may generally represent a combined system implementing the functions of financial institution system 120, prediction analytics system 130, and mapping service system 140 of FIG. 1. Accordingly, cloud system 400 may represent an alternate implementation of financial institution system 120, prediction analytics system 130, and mapping service system 140. In other examples, cloud system 400 might not combine all of financial institution system 120, prediction analytics system 130, and mapping service system 140. For instance, financial institution system 120 and prediction analytics system 130 might be combined in another implementation, with mapping service system 140 implemented separately.

In the example of FIG. 2, cloud system 400 includes power source 401, one or more processors 405, one or more input/output devices 410, one or more communication units 412, and one or more storage devices 440. Communication channels 402 may interconnect each of the components of cloud system 400 for inter-component communications (physically, communicatively, and/or operatively). In some examples, communication channels 402 may include a system bus, a network connection, an inter-process communication data structure, or any other method for communicating data.

Power source 401 may provide power to one or more components of cloud system 400. Power source 401 may receive power from the primary alternative current (AC) power supply in a building, home, or other location. In other examples, power source 401 may be a battery. In still further examples, cloud system 400 and/or power source 401 may receive power from another source. Power source 401 may have intelligent power management or consumption capabilities, and may such features may be controlled, accessed, or adjusted by one or more modules of cloud system 400 and/or by one or more processors 405 to intelligently consume, allocate, supply, or otherwise manage power.

Cloud system 400 may also include one or more input/output devices 410 that may generate, receive, or process input and/or output. For example, input/output devices 410 may generate or receive input from a keyboard, pointing device, voice responsive system, video camera, button, sensor, mobile input device, control pad, microphone, presence-sensitive screen, network, or any other type of device for detecting input from a human or machine. Further, input/output devices 410 may generate output in the form of tactile, audio, visual, and/or video output. Input/output devices 410 may include a display, sound card, video graphics adapter card, speaker, presence-sensitive screen, one or more USB interfaces, video and/or audio output interfaces, or any other type of device capable of generating tactile, audio, video, or other output. In some examples, input/output devices 410 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 412 of cloud system 400 may communicate with devices external to cloud system 400 by transmitting and/or receiving data, and may operate, in some respects, as both an input device and an output device. In some examples, communication units 412 may communicate with other devices over a network. In other examples, communication units 412 may send and/or receive radio signals on a radio network such as a cellular radio network. In other examples, communication units 412 of cloud system 400 may transmit and/or receive satellite signals on a satellite network such as a Global Positioning System (GPS) network. Examples of communication units 412 include a network interface card (e.g. such as an Ethernet card), an optical transceiver, a radio frequency transceiver, a GPS receiver, or any other type of device that can send and/or receive information. Other examples of communication units 412 may include Bluetooth®, GPS, 3G, 4G, and Wi-Fi® radios found in mobile devices as well as Universal Serial Bus (USB) controllers and the like.

One or more processors 405 of cloud system 400 may implement functionality and/or execute instructions associated with cloud system 400. Examples of processors 405 include microprocessors, application processors, display controllers, auxiliary processors, one or more sensor hubs, and any other hardware configured to function as a processor, a processing unit, or a processing device. Cloud system 400 may use one or more processors 405 to perform operations in accordance with one or more aspects of the present disclosure using software, hardware, firmware, or a mixture of hardware, software, and firmware residing in and/or executing at cloud system 400.

One or more storage devices 440 within cloud system 400 may store information for processing during operation of cloud system 400. In some examples, one or more storage devices 440 are temporary memories, meaning that a primary purpose of the one or more storage devices is not long-term storage. Storage devices 440 on cloud system 400 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 440, in some examples, also include one or more computer-readable storage media. Storage devices 440 may be configured to store larger amounts of information than volatile memory. Storage devices 440 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 440 may store program instructions and/or data associated with one or more of the modules described in accordance with one or more aspects of this disclosure.

One or more storage devices 440 of cloud system 400 may include one or more modules, as further described herein. One or more processors 405 and one or more storage devices 440 may provide an operating environment or platform for such modules, which may be implemented as software, but may in some examples include any combination of hardware, firmware, and software. One or more processors 405 may execute instructions and one or more storage devices 440 may store instructions and/or data of one or more modules. The combination of processors 405 and storage devices 440 may retrieve, store, and/or execute the instructions and/or data of one or more applications, modules, or software. Processors 405 and/or storage devices 440 may also be operably coupled to one or more other software and/or hardware components, including, but not limited to, one or more of the components illustrated in FIG. 2.

One or more modules illustrated in FIG. 2 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

Account management module 442 may generally perform operations or functions corresponding to financial institution system 120 of FIG. 1, and may provide investment services to one or more operators of computing devices 200. Account management module 442 may authenticate one or more users of computing devices 200 and establish a session with each computing device 200 operated by such authorized users. Account management module 442 may receive information about an investment goal and constraints or parameters relating to the investment goal, and may determine user interface information representing one or more investment options. Account management module 442 may output the user interface information over network 110 for display at one or more computing devices 200. Account management module 442 may interact with and/or operate in conjunction with one or more modules of cloud system 400.

Account records 452 may represent any suitable storage medium for storing information related to user accounts, investments held, authentication credentials, and other information. The information stored in account records 452 may be searchable and/or categorized such that one or more modules within cloud system 400 may provide an input requesting information from account records 452, and in response to the input, receive information stored within account records 452. Account records 452 may be primarily maintained by 442 and may store account information one or more users of computing devices 200. Account records 452 may receive from communication unit 412 information for one or more users of computing devices 200. Account records 452 may provide other modules with access to the data stored within account records 452, and/or may analyze the data stored within account records 452 and output such information on behalf of other modules of cloud system 400.

Analytics module 444 may generally perform operations or functions corresponding to prediction analytics system 130 of FIG. 1, and may provide analytical, prediction, and/or portfolio analysis services for one or more modules of cloud system 400. Analytics module 444 may receive information about an investment goal, along with one or more constraints or parameters relating to the investment goal. Analytics module 444 may analyze the information received, and determine one or more investment options for achieving the investment goal. Analytics module 444 may interact with and/or operate in conjunction with one or more modules of cloud system 400.

Mapping module 446 may generally perform operations or functions corresponding to mapping service system 140 of FIG. 1, and may provide mapping services or information to one or more modules of cloud system 400. For example, mapping module 446 may receive information or a request relating to a travel path, a travel plan, and/or geographical parameters. Mapping module 446 may analyze such information, and output mapping, travel, or geographical information, which may include satellite imagery, street maps, views of streets, real-time traffic conditions, and route planning information for travel by air, boat, train, bus, car, bicycle, foot, or other mode of transportation.

Computing device 200 of FIG. 2 is described below as an example or alternate implementation of one or more of computing devices 200 of FIG. 1. FIG. 2 illustrates one example implementation of computing devices 200, and other example or alternate implementations of computing device 200 may be used or may be appropriate in other instances. Such implementations may include a subset of the components included in the example of FIG. 2 and/or may include additional components not shown in FIG. 2.

In the example of FIG. 2, computing device 200 includes power source 201, one or more processors 205, one or more input/output devices 210, one or more communication units 212, and one or more storage devices 240. Communication channels 202 may interconnect each of the components of computing device 200 for inter-component communications (physically, communicatively, and/or operatively). In some examples, communication channels 202 may include a system bus, a network connection, an inter-process communication data structure, or any other method for communicating data.

Power source 201 may provide power to one or more components of computing device 200. Power source 201 may be a battery. In other examples, power source 201 may receive power from the primary alternative current (AC) power supply in a building, home, or other location. In still further examples, computing device 200 and/or power source 201 may receive power from another source. Power source 201 may have intelligent power management or consumption capabilities, and may such features may be controlled, accessed, or adjusted by one or more modules of computing device 200 and/or by one or more processors 205 to intelligently consume, allocate, supply, or otherwise manage power.

Computing device 200 may also include one or more input/output devices 210 that may generate, receive, or process input and/or output. For example, input/output devices 210 may generate or receive input from a keyboard, pointing device, voice responsive system, video camera, button, sensor, mobile input device, control pad, microphone, presence-sensitive screen, network, or any other type of device for detecting input from a human or machine. Further, input/output devices 210 may generate output in the form of tactile, audio, visual, and/or video output. Input/output devices 210 may include a display, sound card, video graphics adapter card, speaker, presence-sensitive screen, one or more USB interfaces, video and/or audio output interfaces, or any other type of device capable of generating tactile, audio, video, or other output. In some examples, input/output devices 210 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 212 of computing device 200 may communicate with devices external to computing device 200 by transmitting and/or receiving data, and may operate, in some respects, as both an input device and an output device. In some examples, communication units 212 may communicate with other devices over a network. In other examples, communication units 212 may send and/or receive radio signals on a radio network such as a cellular radio network. In other examples, communication units 212 of computing device 200 may transmit and/or receive satellite signals on a satellite network such as a Global Positioning System (GPS) network. Examples of communication units 212 include a network interface card (e.g. such as an Ethernet card), an optical transceiver, a radio frequency transceiver, a GPS receiver, or any other type of device that can send and/or receive information. Other examples of communication units 212 may include Bluetooth®, GPS, 3G, 4G, and Wi-Fi® radios found in mobile devices as well as Universal Serial Bus (USB) controllers and the like.

One or more processors 205 of computing device 200 may implement functionality and/or execute instructions associated with computing device 200. Examples of processors 205 include microprocessors, application processors, display controllers, auxiliary processors, one or more sensor hubs, and any other hardware configured to function as a processor, a processing unit, or a processing device. Computing device 200 may use one or more processors 205 to perform operations in accordance with one or more aspects of the present disclosure using software, hardware, firmware, or a mixture of hardware, software, and firmware residing in and/or executing at computing device 200.

One or more storage devices 240 within computing device 200 may store information for processing during operation of computing device 200. In some examples, one or more storage devices 240 are temporary memories, meaning that a primary purpose of the one or more storage devices is not long-term storage. Storage devices 240 on computing device 200 may be configured for short-term storage of information as volatile memory and therefore not retain stored contents if deactivated. Storage devices 240, in some examples, also include one or more computer-readable storage media. Storage devices 240 may be configured to store larger amounts of information than volatile memory. Storage devices 240 may further be configured for long-term storage of information as non-volatile memory space and retain information after activate/off cycles. Storage devices 240 may store program instructions and/or data associated with one or more of the modules described in accordance with one or more aspects of this disclosure.

One or more storage devices 240 of computing device 200 may include one or more modules, as further described herein. One or more processors 205 and one or more storage devices 240 may provide an operating environment or platform for such modules, which may be implemented as software, but may in some examples include any combination of hardware, firmware, and software. One or more processors 205 may execute instructions and one or more storage devices 240 may store instructions and/or data of one or more modules. The combination of processors 205 and storage devices 240 may retrieve, store, and/or execute the instructions and/or data of one or more applications, modules, or software. Processors 205 and/or storage devices 240 may also be operably coupled to one or more other software and/or hardware components, including, but not limited to, one or more of the components of computing device 200 and/or one or more devices or systems illustrated as being connected to computing device 200.

Computing device 200 may include user interface device 211; user interface device 211 may function as an input and/or output device for computing device 200. User interface device 211 may be implemented using various technologies. For instance, user interface device 211 may function as an input device using a presence-sensitive input screen, such as a resistive touchscreen, surface acoustic wave touchscreen, capacitive touchscreen, projective capacitance touchscreen, pressure sensitive screen, acoustic pulse recognition touchscreen, or another presence-sensitive display technology. In addition, user interface device 211 may include microphone technologies, infrared sensor technologies, or other input device technology for use in receiving user input.

User interface device 211 may function as output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 200. In addition, user interface device 211 may include speaker technologies, haptic feedback technologies, or other output device technologies for use in outputting information to a user.

User interface device 211 may include a presence-sensitive display that may receive tactile input from a user of computing device 200. User interface device 211 may receive indications of tactile input by detecting one or more gestures from a user (e.g., the user touching or pointing to one or more locations of user interface device 211 with a finger or a stylus pen). User interface device 211 may present output to a user, for instance, at a presence-sensitive display. User interface device 211 may present the output as a graphical user interface. For example, user interface device 211 may present various user interfaces (e.g., user interface 300) related to functions provided by one or more modules of computing device 200 or another feature of a computing platform, operating system, application, and/or service executing at or accessible from computing device 200 (e.g., an electronic message application, Internet browser application, a mobile or desktop operating system, etc.).

User interface module 241 may manage user interactions with user interface device 211 and other components of computing device 200. User interface module 241 may cause user interface device 211 to output various user interfaces for display or presentation, as a user of computing device 200 views output and/or provides input at user interface device 211. User interface device 211 may detect input, and may output to user interface module 241 one or more indications of input as a user of computing device 200 interacts with a user interface presented at user interface device 211. User interface module 241 and user interface device 211 may interpret inputs detected at user interface device 211 and may relay information about the inputs detected at user interface device 211 to one or more associated platforms, operating systems, applications, and/or services executing at computing device 200 to cause computing device 200 to perform one or more functions.

User interface module 241 may receive information and instructions from a platform, operating system, application, and/or service executing at computing device 200 and/or one or more remote computing systems, such as, for example, computing device 200. In addition, user interface module 241 may act as an intermediary between a platform, operating system, application, and/or service executing at computing device 200 and various output devices of computing device 200 (e.g., speakers, LED indicators, audio or electrostatic haptic output devices, displays, etc.) to produce output (e.g., a graphic, a flash of light, a sound, a haptic response, etc.).

User interface module 241 may perform operations described using software, hardware, firmware, or a mixture of hardware, software, and firmware residing in and/or executing at computing device 200. Computing device 200 may execute user interface module 241 with multiple processors or multiple devices, as a virtual machine executing on underlying hardware, as one or more services of an operating system or computing platform, and/or as one or more executable programs at an application layer of a computing platform.

Investment mapping module 244 may generally perform functions relating to presenting, at computing device 200, investment information in terms of a travel plan within a graphical representation of a travel map. Investment mapping module 244 might be included in some of computing devices 200. In other examples, investment mapping module 244 might be included in all of computing devices 200. Investment mapping module 244 may interact with and/or operate in conjunction with one or more modules of computing device 200. Investment mapping module 244 may receive investment option information over network 110 from cloud system 400, and may cause user interface module 241 to present a graphical user interface at user interface device 211. The graphical user interface may present investment options as travel plans, travel maps, and/or travel options. Investment mapping module 244 may receive indications of input that it determines corresponds to one or more investment goals and investment constraint values, and/or investment parameters. Such information may be received in terms of travel options. Investment mapping module 244 may determine, based on one or more indications of input, one or more chosen investments. Investment mapping module 244 may output information to one or more other modules. Investment mapping module 244 may transmit information (e.g., investment parameters) to one or more servers over network 110.

In some examples, investment mapping module 244 may be or may include a web browser, and may function by rendering content received from one or more server devices on network 110. In such an example, one or more functions, operations, or other actions attributed to investment mapping module 244 herein may be alternatively attributed to other modules, components, or devices (e.g., devices shown in FIG. 1 or FIG. 2), including one or more servers on network 110.

One or more application modules 249 may represent some or all of the other various individual applications and/or services executing at and accessible from computing device 200. A user of computing device 200 may interact with a graphical user interface associated with one or more application modules 249 to cause computing device 200 to perform a function. Numerous examples of application modules 249 may exist and may include web browsing, search, communication, and shopping applications, and any and all other applications that may execute at computing device 200.

FIG. 3A, FIG. 3B, FIG. 3C, and FIG. 3D are conceptual diagrams illustrating example graphical user interfaces presented by an example computing device that is configured to present investment options as travel plans in accordance with one or more aspects of the present disclosure. The graphical user interfaces presented in FIG. 3A, FIG. 3B, FIG. 3C, and/or FIG. 3D may correspond to a graphical user interface output by computing device 200A of FIG. 1 or computing device 200 of FIG. 2. One or more aspects of FIG. 3A, FIG. 3B, FIG. 3C, and FIG. 3D may be described below within the context of FIG. 2. The user interfaces illustrated in FIG. 3A, FIG. 3B, FIG. 3C, and FIG. 3D represent examples; many other examples of user interfaces may be presented, used, or implemented in other situations, instances, or implementations.

In the examples of FIG. 3A, FIG. 3B, FIG. 3C, and FIG. 3D, a map of a western portion of the United States is illustrated. Various cities (numbered 301 to 324) are illustrated as dots, with state boundaries illustrated as dotted lines. Each of user interfaces illustrated in FIG. 3A, FIG. 3B, FIG. 3C, and FIG. 3D include input area 390 and map area 399 presented within user interface device 211. In these examples, the portion of the world chosen to be illustrated may correspond to an area of the world that a particular user may consider to be familiar. Accordingly, for other users, in other examples, a different area of the world may be depicted. Further, a larger or smaller geographical area may be illustrated. For example, the scope of a map in an alternate implementation may range from illustrating a small geographical area (e.g., street-level detail) to illustrating a large geographical area (e.g., multiple nations).

Figure 3A:
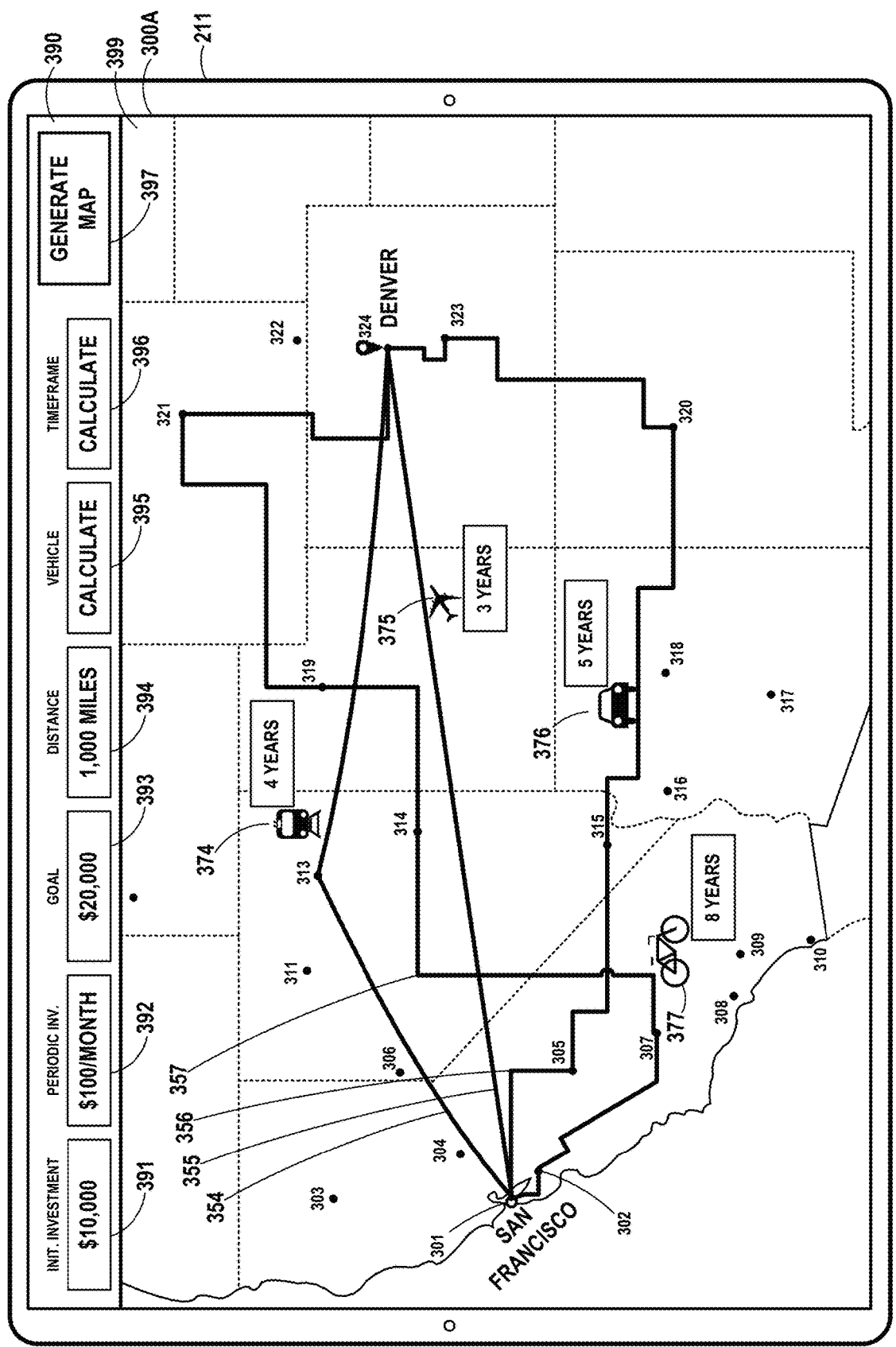
FIG. 3A, FIG. 3B, FIG. 3C, and FIG. 3D are conceptual diagrams illustrating example graphical user interfaces presented by an example computing device that is configured to present investment options as travel plans in accordance with one or more aspects of the present disclosure.

Computing device 200 may present investment options in the form of travel plans, as illustrated in user interface 300A of FIG. 3A. For example, with reference to FIG. 2, user interface device 211 may detect input, and output to user interface module 241 an indication of input. User interface module 241 may output to investment mapping module 244 information about the input. Investment mapping module 244 may determine that the input corresponds to investment parameters. In some examples, investment parameters may include an initial investment, a periodic (e.g., monthly) investment, a goal dollar value, and a timeframe. Investment mapping module 244 may cause communication unit 212 to output, over network 110, one or more investment parameters. Communication unit 412 of cloud system 400 may detect input, and output an indication of input to account management module 442. Account management module 442 may determine that the input corresponds to one or more investment parameters for the user operating computing device 200. Account management module 442 may output to analytics module 444 information about the investment parameters. Analytics module 444 may generate one or more investment options in accordance with the investment parameters, and such investment options may include predicted investment results, predicted timeframes, and information about risk associated with one or more investments.

Analytics module 444 may output to account management module 442 information about the investment options. Account management module 442 may generate information for presenting the investment options in the form of a map. In doing so, account management module 442 may request information from mapping module 446, and may incorporate mapping information into the information about the investment options. Account management module 442 may cause communication unit 412 to output, over network 110, information that can be used to generate a user interface that presents the investment options in the form of travel plans. Communication unit 212 of computing device 200 may detect input, and output to investment mapping module 244 information about the input. Investment mapping module 244 may determine that the input corresponds to information for generating a user interface. Investment mapping module 244 may generate user interface 300A, and cause user interface module 241 to present user interface 300A at user interface device 211, as shown in FIG. 3A.

In the example of FIG. 3A, computing device 200 illustrates within map area 399 four investment options presented as travel plans from San Francisco 301 to Denver 324. Each of the four travel paths (path 354, path 355, path 356, and path 357) is associated with a vehicle and a timeframe for reaching Denver 324. Reaching Denver 324 corresponds to reaching the investment goal. For example, path 354 corresponds to a travel plan involving a train as a mode of transportation, as indicated by vehicle icon 374. In path 354, the train is scheduled to start at San Francisco 301, and then travel to Elko 313, and then to Denver 324. In the example of FIG. 3A, traveling path 354 is expected to take four years, as indicated by the small information box presented next to vehicle icon 374 within user interface 300A. In other examples, more or less stops might be scheduled to be included in path 354.

Path 355 corresponds to a travel plan involving an airplane as a mode of transportation, as indicated by vehicle icon 375. In path 355, the airplane is scheduled to start at San Francisco 301 and arrive at Denver 324, without any stops, in three years. In other examples, path 355 might include one or more stops.

Path 356 corresponds to a travel plan involving an automobile as a mode of transportation, as indicated by vehicle icon 376. In path 356, the automobile is scheduled to start a five-year journey at San Francisco 301, and then travel to Fresno 305, then to Las Vegas 315, then to Albuquerque 320, then to Colorado Springs 323, and then finally to Denver 324.

Path 357 corresponds to a travel plan involving a bicycle as a mode of transportation, as indicated by vehicle icon 377. In path 357, the bicycle is scheduled to start an eight-year journey at San Francisco 301, and then travel to San Jose 302, then to Bakersfield 307, then to Ely 314, then to Salt Lake City 319, then to Casper 321, and then arrive at Denver 324.

The map illustrated in user interface 300A may be or may be analyzed as a directed acyclic graph that consists of a finite number of vertices and edges, with each edge directed from one vertex to another. The map illustrated in user interface 300A may be alternatively or in addition considered a directed graph that has a topological ordering. Cities within the map may be considered vertices within the directed acyclic graph, and paths between cities may be considered edges. Cities within the map may also serve as milestones within a directed acyclic graph illustrating multiple paths between a starting city and a destination city. When generating investment options, analytics module 444 may analyze cities on the map according to principles applicable to directed acyclic graphs, and may determine one or more paths, including the shortest paths and longest paths between two cities. Analytics module 444 may determine the optimal route between two cities, based on travel time and vehicle options and choices.

In FIG. 3A, path 354, path 355, path 356, and path 357 each represent an expected or predicted path that may change as the future unfolds. As in an actual travel plan, unforeseen circumstances may result in a different investment path being taken. For example, in an actual travel plan, several factors, such as traffic, construction, car trouble, bad weather, schedule changes, and/or other circumstances, may result in a different travel path being taken. In some situations, backtracking to places previously visited may be required, or extended stopovers or breaks from travel may be taken. Alternate modes of transportation may be considered or taken. Travel may take more or less time than expected. Some travel plans might involve risk and uncertainty, such as those requiring travel through a mountainous region during times prone to quickly-developing snowstorms, which may slow or otherwise impact travel times.

Correspondingly, an investment plan may have attributes that parallel those in a travel plan. For example, an investment plan may unfold differently than originally planned, and may involve modified investments, underperforming investments, overperforming investments, market climate changes, money lost, windfall gains, modifications due to schedule changes, and the like. A modified investment might be represented in user interface 300A as a change to the mode of travel (switching from car travel to air travel). An underperforming investment might be represented in user interface 300A as a slowing of vehicle icon 374, a detour, or travelling in reverse. A market climate, such as a bear market, might be represented as a lengthening of predicted travel times. Windfall gains, or a bull market climate, might be represented as increased speed of vehicle icon 374, and/or reduced travel times. Travel paths involving risky investments or travel paths where predicted travel times are more volatile might be drawn accordingly. For example, such a travel path might be drawn in red, annotated with construction icons, traffic icons, accident icons, or otherwise highlighted to indicate potential risks and delays. Less risky investments might be drawn with a different color, such as green or white, to suggest smooth investment results might reasonably be expected. Periodic investments made during the journey may have the effect of increasing the speed of a vehicle corresponding to an investment.

In the example of FIG. 3A, the illustrated travel routes within user interface 300A may correspond to routes determined by cloud system 400 in response to one or more investment parameters derived from user input. In the example of FIG. 3A, computing device 200 may have detected user input as a result of interactions with input area 390 resulting in the values illustrated in FIG. 3A. For example, user interface device 211 of computing device 200 may detect input at or near a location where user interface device 211 presents initial investment field 391. User interface device 211 of computing device 200 may detect input at or near a location where user interface device 211 presents an on-screen keyboard within user interface 300A. Alternatively, or in addition, one or more input devices associated with input/output devices 210 (e.g., a keyboard or a voice recognition system) may detect input. User interface device 211 or one or more input/output devices 210 may output to user interface module 241 an indication of input. User interface module 241 may output to investment mapping module 244 information about the input. Investment mapping module 244 may determine that the input corresponds to the user entering $10,000 within initial investment field 391. Investment mapping module 244 may cause user interface module 241 to format and display "$10,000" within initial investment field 391. Similarly, user interface device 211 may detect input at or near a location where user interface device 211 presents periodic investment field 392 and goal field 393. Investment mapping module 244 may determine that the input corresponds to a periodic investment ($100/month) and a goal investment ($20,000). Investment mapping module 244 may cause user interface module 241 to present at user interface device 211 the values shown in FIG. 3A within periodic investment field 392 and goal field 393. Similarly, investment mapping module 244 may cause user interface module 241 to present values within distance field 394, vehicle field 395, and timeframe field 396 that correspond to user input.

In some examples, for one or more of initial investment field 391, periodic investment field 392, goal field 393, distance field 394, vehicle field 395, and timeframe field 396, computing device 200 may detect input (or a lack of input) that it determines corresponds to a user's request to calculate one or more fields of input area 390, based on constraints or parameters specified by one or more other fields. For instance, in the example of FIG. 3A, the values included within initial investment field 391, periodic investment field 392, goal field 393, and distance field 394 are specified as constraints, and when user interface 300A is generated, the values corresponding to vehicle field 395 and timeframe field 396 are presented as options within map area 399. Cloud system 400 may, based on the constraints imposed by values in initial investment field 391, periodic investment field 392, and goal field 393, determine one or more vehicles and timeframes that satisfy the proposed investment goal, based on the constraints. In the example of FIG. 3A, cloud system 400 has determined at least four travel plans that may result in reaching the proposed investment goal. The vehicles determined by cloud system 400 are illustrated by vehicle icon 374, vehicle icon 375, vehicle icon 376, and vehicle icon 377. The corresponding paths determined by cloud system 400 are illustrated by path 354, path 355, path 356, and path 357. In some examples, depending on the constraints, cloud system 400 may determine that there is no vehicle or path that will result in reaching the proposed investment goal.

Map area 399 may be dynamically updated in response to user input modifying one or more of initial investment field 391, periodic investment field 392, goal field 393, distance field 394, vehicle field 395, or timeframe field 396. For example, user interface device 211 may detect input at or near where user interface device 211 presents goal field 393. Investment mapping module 244 may determine that the input corresponds to an increase in the value presented within goal field 393 (e.g., the goal might be increased from $20,000 to $25,000). Investment mapping module 244 may cause user interface module 241 to update and format for display the value $25,000 within goal field 393 of user interface 300A.

User interface device 211 may detect input at or near where user interface device 211 presents generate map button 397. Investment mapping module 244 may determine that the input corresponds to selection of generate map button 397. Investment mapping module 244 may cause communication unit 212 to output, over network 110, investment parameters corresponding to the values in input area 390, which may include the updated investment goal displayed within goal field 393. Communication unit 412 of cloud system 400 may detect input and output to account management module 442 an indication of input. Account management module 442 may interact with analytics module 444 and/or mapping module 446, and determine information for an updated user interface reflecting the increased value in goal field 393. Account management module 442 may cause communication unit 412 to output information over network 110. Communication unit 212 of computing device 200 may detect the information, and output an indication of the input received to investment mapping module 244. Investment mapping module 244 may cause user interface module 241 to present an updated user interface 300A at user interface device 211, reflecting adjusted or new travel plans that may result in reaching the updated investment goal of $25,000.

Further, the map illustrated in FIG. 3A may itself be interactive. Computing device 200 may modify the map in response to interactions with the map, in response to interactions with one or more vehicles on the map, and/or in response to interactions with one or more paths or portions of paths on the map. For example, computing device 200 may detect that a user has moved the vehicle along the path, changed the vehicle used, interacted with the vehicle to change the speed of the vehicle, or rerouted a vehicle along a different path. In response to such interactions, computing device 200 may update user interface 300A to illustrate how the path and/or investment results have changed. Computing system 200 may also recommend one or more investments or modifications to existing investments to support the detected changes.

Figure 3B:
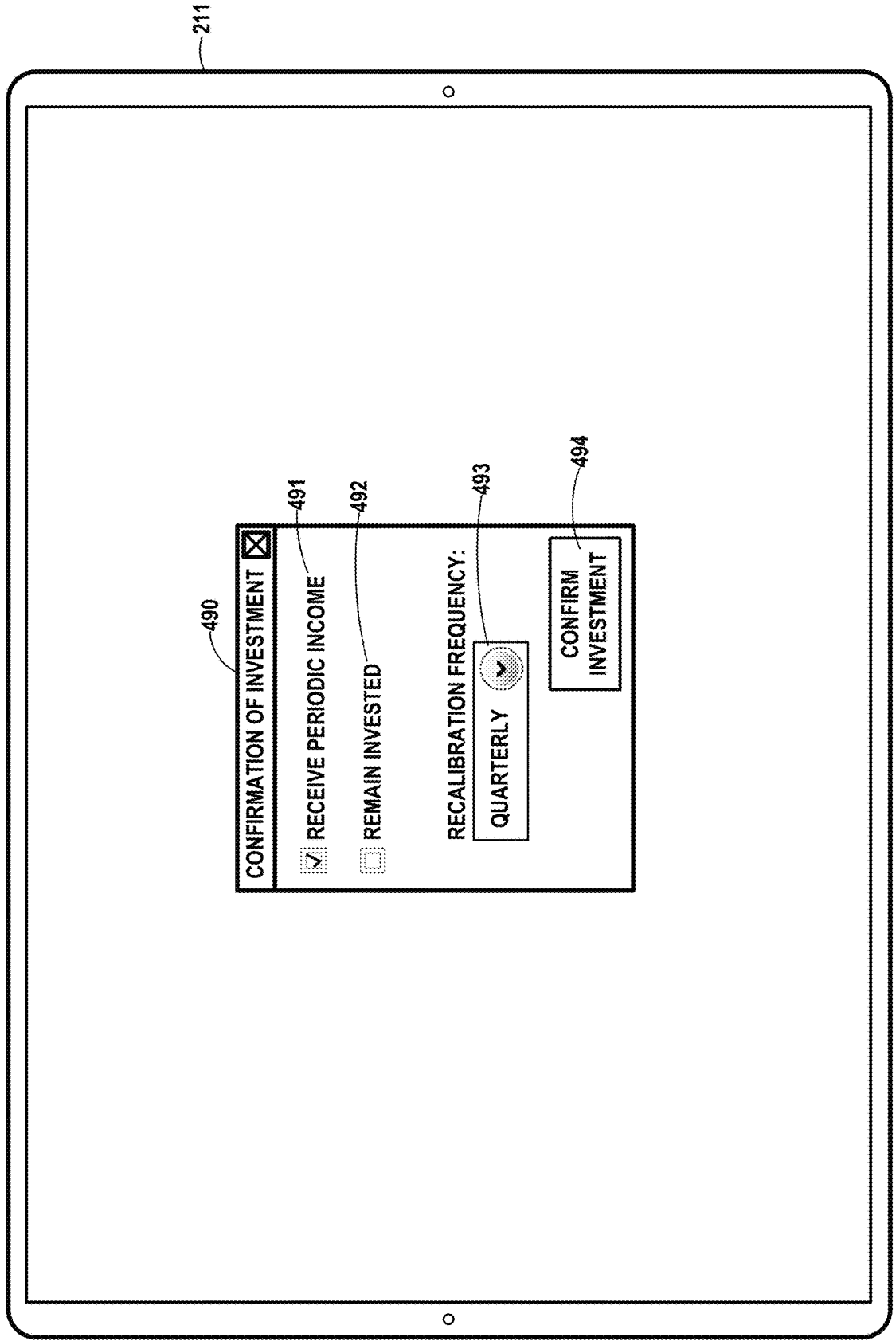
Figure 3C:
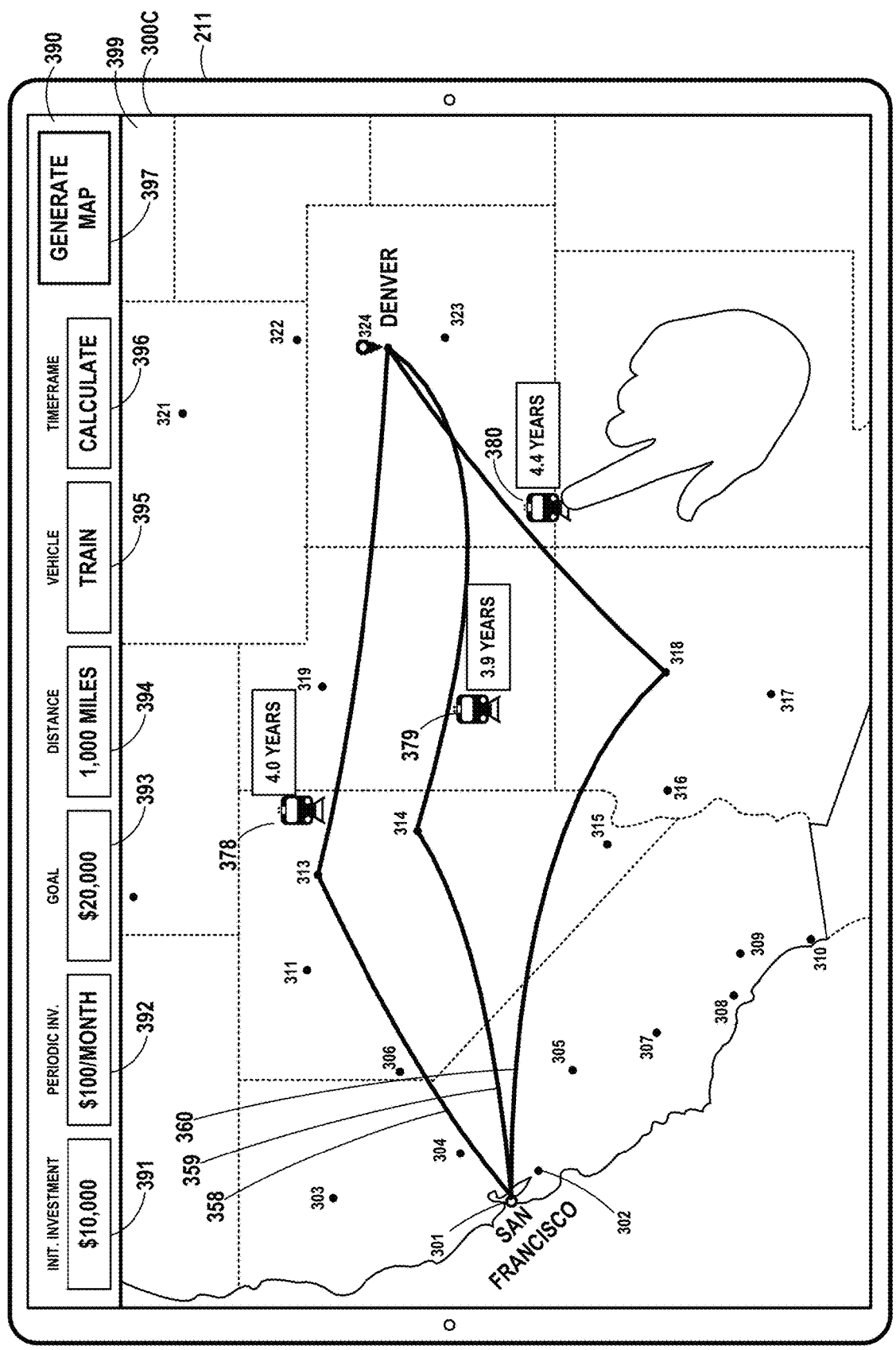

Computing device 200 may confirm an investment and options relating to the investment. In the example of FIG. 3B, computing device 200 presents investment option user interface 490 in response to selection of vehicle icon 375 in FIG. 3A. For example, still referring to FIG. 3A, user interface device 211 may detect input at or near where user interface device 211 presents vehicle icon 375. User interface device 211 may output to user interface module 241 an indication of input. User interface module 241 may output to investment mapping module 244 information about the input. Investment mapping module 244 may determine that the input corresponds to selection of vehicle icon 375. Investment mapping module 244 may cause user interface module 241 to present investment option user interface 490 as illustrated in FIG. 3C.

Investment option user interface 490 of FIG. 3B includes investment option 491, investment option 492, and recalibration investment option 493. Investment option 491 and investment option 492 presents options relating to reinvesting any income that may be derived from one or more investments. For example, when the checkbox associated with investment option 491 is checked, cloud system 400 may make periodic income payments to the investor authenticated at computing device 200 as an investment permits or requires. In another example, when the checkbox associated with investment option 492 is checked, cloud system 400 may cause any income derived from an investment to be reinvested. Selection of checkboxes associated with investment option 491 and investment option 492 may be mutually exclusive, so that only one of the two checkboxes is selected. In other examples, the checkboxes associated with investment option 491 and investment option 492 might not be mutually exclusive, so that some income derived from the investment might result in periodic income, whereas other income might be reinvested. Recalibration investment option 493 presents options relating to timing of investment recalibrations. In some examples, as further described below in connection with FIG. 4A and FIG. 4B, cloud system 400 may modify one or more investments and reallocate, readjust, reconfigure, and/or revise travel plans, investment plans, or goals. Cloud system 400 may periodically schedule or perform such a recalibration periodically, consistent with the frequency selected in recalibration investment option 493.

Computing device 200 may cause an investment to be deployed. For example, with reference to FIG. 2 and FIG. 3B, user interface device 211 may detect input at or near where user interface device 211 presents confirm investment button 494. User interface device 211 may output to user interface module 241 an indication of input. Investment mapping module 244 may determine that the input corresponds to selection of confirm investment button 494.

Investment mapping module 244 may cause communication unit 212 to output a signal over network 110. Communication unit 412 of cloud system 400 may detect the signal, and output to account management module 442 an indication of input. Account management module 442 may determine that the signal corresponds to confirmation, by the authenticated user at computing device 200, of an investment corresponding to path 355 and vehicle icon 375 as presented in user interface 300A. Account management module 442 may cause communication unit 412 to output information about the proposed investment over network 110 to investment market 150. Investment market 150 may receive the information and make the investment. Investment market 150 may respond to account management module 442 with information confirming the investment (e.g., number of shares, trade prices, market the trade took place). Account management module 442 may update account records 452 with information about the investment. Information used to update account records 452 may include information received from investment market 150. Account management module 442 may cause communication unit 412 to send a signal, communication, email, or other information over network 110. Communication unit 212 of computing device 200 may receive the signal, communication, email, or other communication, and computing device 200 may present information confirming the investment. In some examples, due to delays inherent in making, clearing, and settling some types of investments, computing device 200 might not present information confirming the investment until hours, days, or weeks after detecting selection of confirm investment button 494. In other examples, one or more other computing devices 200 may be operated by the authenticated user at a later time, and one or more of such other computing devices 200 may receive confirmation of the investment on behalf of the user (e.g., an email).

Computing device 200 may present multiple tiers of investment options in the form of travel plans. In some cases, an investor may be faced with many and perhaps hundreds of viable investment options. It might be counterproductive to present all of such investment options as travel plans or travel paths in the same map. Computing device 200 may initially present some of the basic plans or paths in user interface 300A, may detect selection of one of the plans, and then present other plans.

For instance, in the example of FIG. 3C, rather than making an investment corresponding to the selected plan (as described earlier in connection with FIG. 3A and FIG. 3B), computing device 200 may present additional travel plans in response to selection of one of the plans. As illustrated in user interface 300C of FIG. 3C, a second tier of investment plans relating to the plan selected in FIG. 3A may be presented. The travel plans illustrated in FIG. 3C may be closely related to the plan selected in user interface 300A of FIG. 3A, and may represent subcategories of the plan selected in FIG. 3A (e.g., each involve a train as a mode of transportation). Accordingly, computing device 200 may, in response to selection of a plan in FIG. 3A, present a second tier of investment plan options, thereby enabling an investor to progressively narrow down investment options by selecting travel plans within user interfaces 300.

For example, with reference to FIG. 3A, user interface device 211 may detect input at or near where user interface device 211 presents vehicle icon 374. User interface device 211 may output to user interface module 241 an indication of input. User interface module 241 may output to investment mapping module 244 information about the input. Investment mapping module 244 may determine that the input corresponds to selection of vehicle icon 374. Investment mapping module 244 may cause communication unit 212 to output, over network 110, a signal. Communication unit 412 of cloud system 400 may detect the signal and output to account management module 442 information about the signal. Account management module 442 may determine that the signal indicates that user selected vehicle icon 374, and account management module 442 may interact with one or more of analytics module 444 and mapping module 446 to generate information for an updated user interface. Account management module 442 may cause communication unit 412 to output information over network 110.

Communication unit 212 of computing device 200 may detect the information and output an indication of the information to investment mapping module 244. Investment mapping module 244 may, based on the information, generate user interface 300C. Investment mapping module 244 may cause user interface module 241 to present user interface 300C at user interface device 211 as illustrated in FIG. 3C.

In FIG. 3C, path 358, path 359, and path 360 each represent an expected or predicted path having the mode of travel selected in user interface 300A. Vehicle icon 378, vehicle icon 379, and vehicle icon 380 correspond to path 358, path 359, and path 360, respectively. Each of the predicted paths may represent travel paths by train, the mode of travel selected in user interface 300A of FIG. 3A. Each travel plan in user interface 300C of FIG. 3C may closely correspond to or may be similar to path 354 of user interface 300A in terms of timeframe and investment goal. In FIG. 3C, path 358, path 359, and path 360 are presented as additional options available for investment.

Upon detecting selection of one or more of path 358, path 359, and path 360 of FIG. 3C, computing device 200 may cause a corresponding investment to be deployed. For example, user interface device 211 may detect input at or near where user interface device 211 presents vehicle icon 380. User interface device 211 may output to user interface module 241 an indication of input. Investment mapping module 244 may determine that the input corresponds to selection of vehicle icon 380. Investment mapping module 244 may present a confirmation similar to that illustrated in FIG. 3B. If confirmation is received or not required, investment mapping module 244 may cause communication unit 212 to output a signal over network 110. Communication unit 412 of cloud system 400 may detect input, determine that the input investment corresponds to make an investment corresponding to path 360 and vehicle icon 380 of user interface 300C. Account management module 442 may cause communication unit 412 to output information about the proposed investment over network 110 to investment market 150. Investment market 150 may receive the information and make the investment.

Figure 3D:
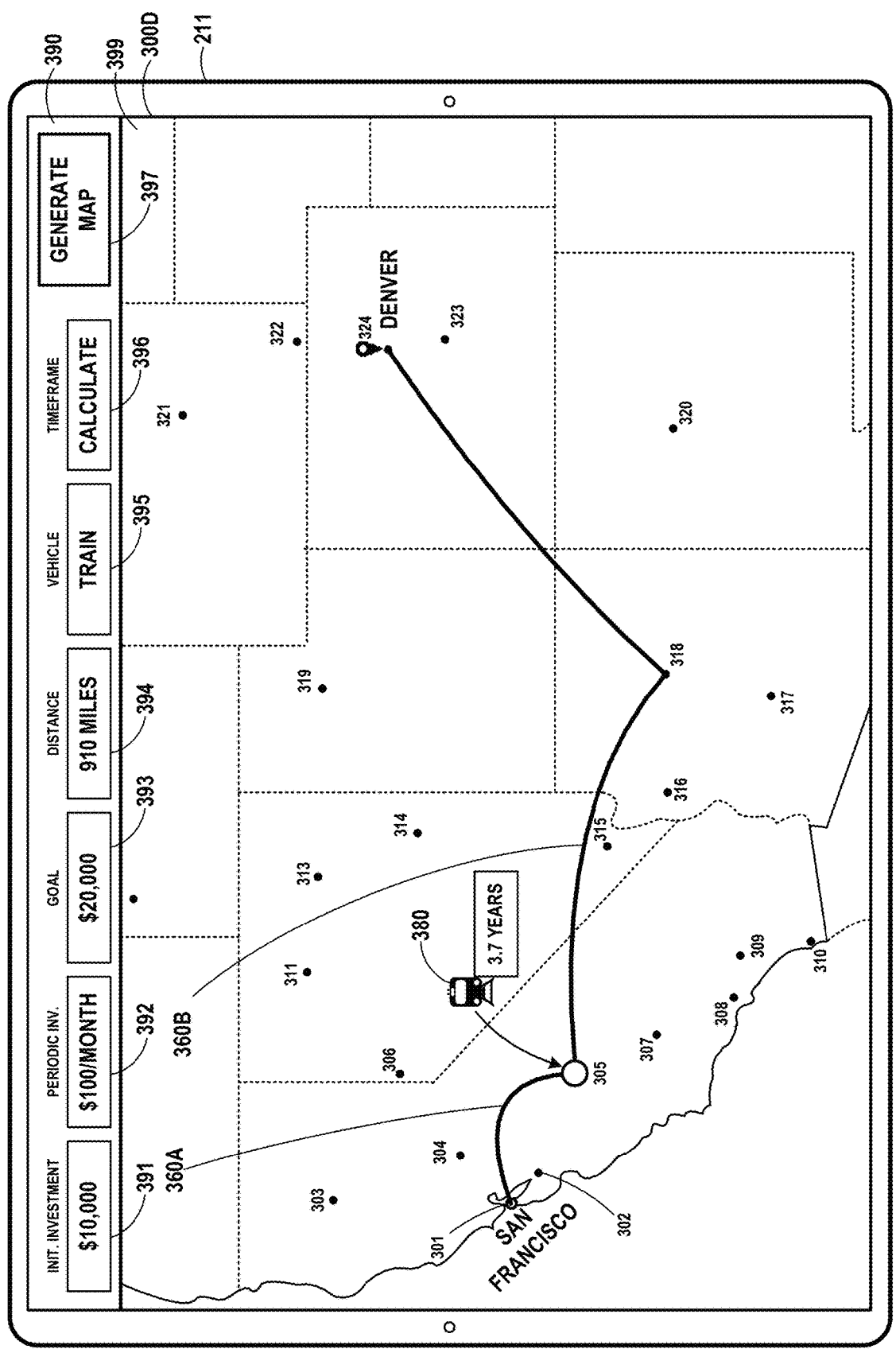

FIG. 3D illustrates an updated user interface 300D, presented in response to detecting a request for an investment status update from computing device 200 operated by an authenticated user. Cloud system 400 may receive a request for a status update weeks, months, or years after funds have been committed to the investment associated with path 360 and vehicle icon 380 described in connection with FIG. 3C. For example, user interface device 211 may detect input, and output to user interface module 241 an indication of input. User interface module 241 may output to investment mapping module 244 information about the input. Investment mapping module 244 may determine that the input corresponds to authentication credentials (e.g., a username and password) for a user of computing device 200. Investment mapping module 244 may cause communication unit 212 to output, over network 110, information about the authentication credentials. Communication unit 412 of cloud system 400 may detect input and output to account management module 442 information about the input. Account management module 442 may determine that the input corresponds to authentication credentials from computing device 200. Account management module 442 may identify an account associated with the authentication credentials, and authenticate the user. Account management module 442 may establish a session, and cause communication unit 412 to output a session identifier over network 110. Communication unit 212 of computing device 200 may detect input and output to investment mapping module 244 information about the input. Investment mapping module 244 may determine that the information corresponds to a session identifier associated with a session established at cloud system 400. Investment mapping module 244 may store the session identifier in storage device 240, and investment mapping module 244 may thereafter use the session identifier when communicating with cloud system 400.

Investment mapping module 244 may cause communication unit 212 to send a request for an investment status update over network 110. Communication unit 412 may detect input and output to account management module 442 an indication of input. Account management module 442 may determine that the input corresponds to a request for an investment status update associated with a user identified by a valid session identifier. Account management module 442 may retrieve information from account records 452, interact with analytics module 444 and/or mapping module 446, and generate information about the user's investment status. Account management module 442 may cause communication unit 412 to output the information to network 110. Communication unit 212 of computing device 200 may detect input, and output to investment mapping module 244 an indication of input. Investment mapping module 244 may determine that the input corresponds to investment status information. Investment mapping module 244 may cause user interface module 241 to present user interface 300D at user interface device 211, as illustrated in FIG. 3D.

FIG. 3D illustrates the state of path 360 after a period of time (e.g., a few months) has passed since an investment corresponding to path 360 was initiated. Path 360 as illustrated in FIG. 3D is composed of historical path 360A and future path 360B. Historical path 360A may represent the past performance of the investment. Vehicle icon 380 is shown at Fresno 305, which may correspond to the status or location, at the time illustrated in FIG. 3D, of the investment along the path from San Francisco 301 to Denver 324. As shown in distance field 394, based on the status of the investment (at Fresno 305) in FIG. 3D, 910 miles remain on the journey to Denver 324. Vehicle icon 380 indicates that 3.9 years remain before the investment goal is reached at Denver 324. Future path 360B in FIG. 3D may represent predicted future investment performance.

As illustrated in FIG. 3D, historical path 360A might not correspond to the previously predicted path for the early part of path 360 as illustrated in FIG. 3C. For example, the early part of path 360 of FIG. 3C follows a slightly less circuitous route than historical path 360A of FIG. 3D, and does not pass through Fresno 305. This may be the result of the actual performance of the investment (path 360A) being different than the predicted performance of the investment (path 360 in FIG. 3C) up until the location of vehicle icon 380 in FIG. 3D. In the example illustrated in FIG. 3D, the expected remaining performance of the investment (future path 360B) may, for the journey from Fresno 305 to Denver 324, be similar to that illustrated in FIG. 3c (path 360). Accordingly, future path 360B in FIG. 3D may roughly follow the path 360 (FIG. 3C) from the current location of vehicle icon 380.

Figure 4A:
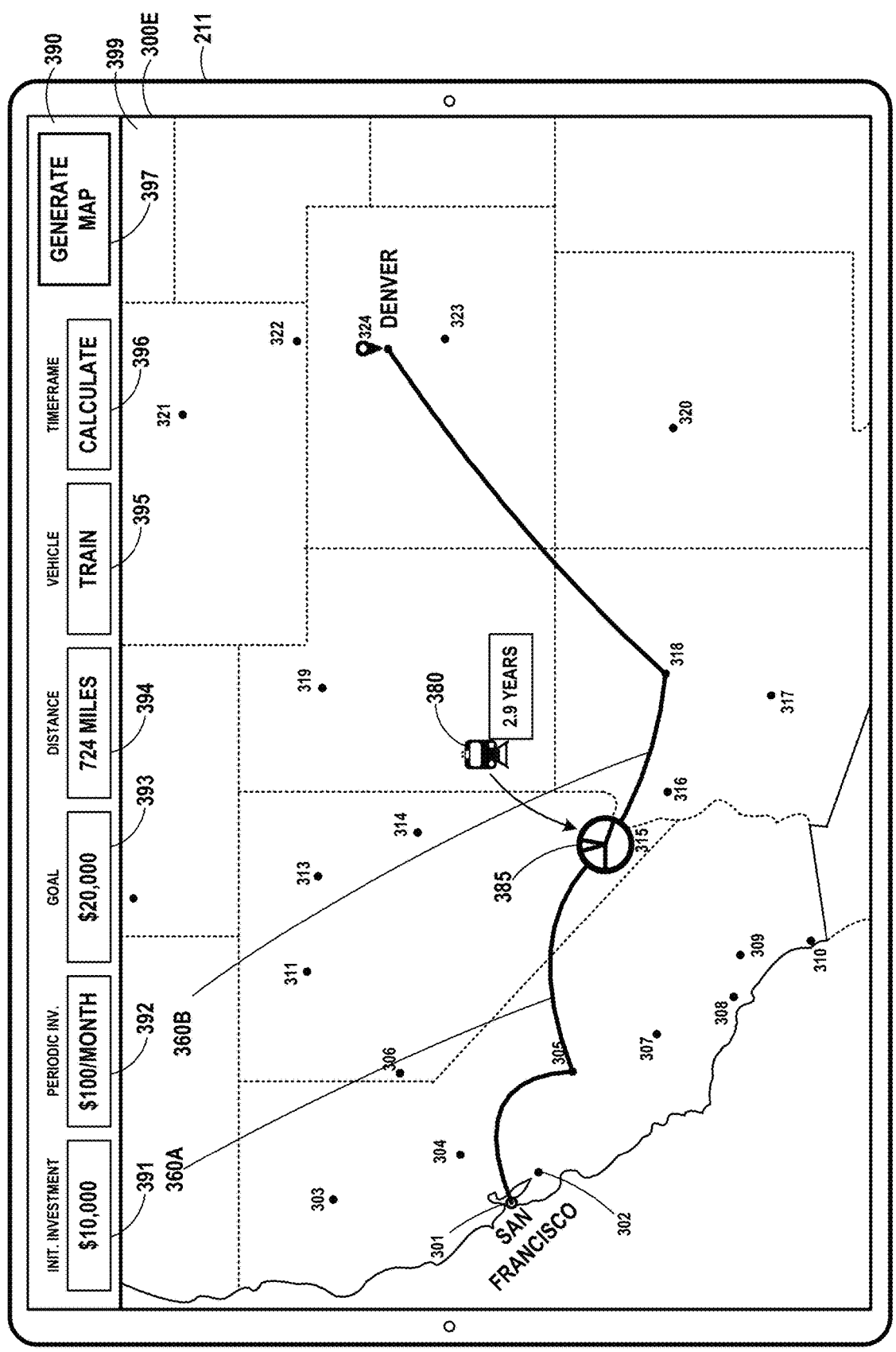
FIG. 4A and FIG. 4B are conceptual diagrams illustrating example graphical user interfaces presented by an example computing device relating to an investment recalibration in accordance with one or more aspects of the present disclosure.
Figure 4B:
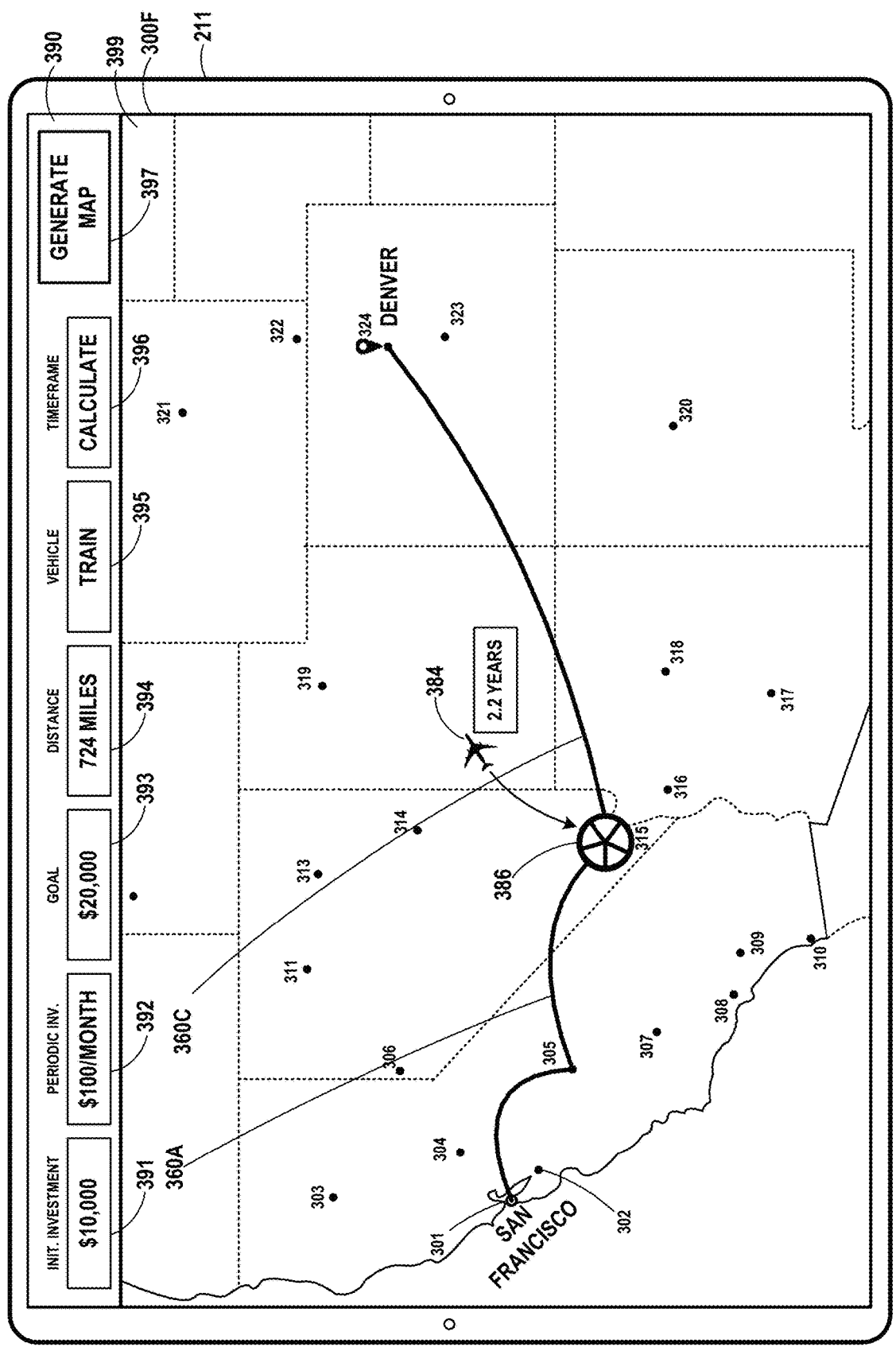

FIG. 4A and FIG. 4B are conceptual diagrams illustrating example graphical user interfaces presented by an example computing device relating to an investment recalibration in accordance with one or more aspects of the present disclosure. The graphical user interfaces presented in FIG. 4A and FIG. 4B may correspond to a graphical user interface output by computing device 200A of FIG. 1 or computing device 200 of FIG. 2. One or more aspects of FIG. 4A and FIG. 4B may be described below within the context of FIG. 2. The user interfaces illustrated in FIG. 4A and FIG. 4B represent examples; many other examples of user interfaces may be presented, used, or implemented in other situations, instances, or implementations FIG. 4A illustrates user interface 300E, which may be presented at user interface device 211 of computing device 200 when computing device 200 and/or cloud system 400 perform a recalibration of the investment initiated in FIG. 3C. For example, prior to presenting user interface 300E, user interface device 211 may detect input that investment mapping module 244 determines corresponds to authentication credentials for a user of computing device 200. Investment mapping module 244 may cause communication unit 212 to transmit over network 110 information about the authentication credentials. Communication unit 412 of cloud system 400 may detect input that account management module 442 determines corresponds to authentication credentials for a user of computing device 200. Account management module 442 may establish a session.

User interface device 211 may detect input that corresponds to a request to perform a recalibration of one or more investments. Investment mapping module 244 may cause communication unit 212 to send a signal over network 110. Communication unit 412 of cloud system 400 may detect input that account management module 442 determines corresponds to a request to recalibrate one or more investments. Account management module 442 may cause communication unit 412 to send information over network 110. Communication unit 212 of computing device 200 may detect input that investment mapping module 244 determines corresponds to information sufficient to generate user interface 300E. Investment mapping module 244 may cause user interface module 241 to present user interface 300E at user interface device 211, as illustrated in FIG. 4A.

In some examples, computing device 200 and/or cloud system 400 may perform recalibrations periodically or in response to a request from an authenticated user. Computing device 200 and/or cloud system 400 may automatically perform recalibrations at the times specified when an investment was established (e.g., as specified at recalibration investment option 493 of FIG. 3B), or may perform such recalibrations in response to input detected by an authenticated user. In some examples, cloud system 400 may remind a user to provide input to cloud system 400 for use in performing a recalibration. Cloud system 400 may remind a user by sending a notification or communication (e.g., email) to the user.

In the example shown in FIG. 4A, user interface 300E illustrates the state of path 360 after a period of time has passed since the status update of FIG. 3D. Path 360 as illustrated in FIG. 4A is composed of historical path 360A and future path 360B. Historical path 360A may represent the past performance of the investment, and may includes portions of historical path 360A as illustrated in FIG. 3D. Future path 360B may represent predicted future investment performance and may, starting with Las Vegas 315, generally align with future path 360B as illustrated in FIG. 3D.

FIG. 4A includes vehicle icon 380 positioned at Las Vegas 315, which may correspond to the location or status, at the time illustrated in FIG. 4A, of the investment along the path from San Francisco 301 to Denver 324. As shown in distance field 394, based on the status of the investment (at Las Vegas 315) in FIG. 4A, 724 miles remain on the journey to Denver 324. Vehicle icon 380 indicates that 2.9 years remain before the investment goal is reached at Denver 324. Portfolio composition icon 385 may represent an illustration of an asset allocation, and may be presented by computing device 200 within user interface 300E in the form of a pie chart.

FIG. 4B illustrates an updated user interface 300F, after computing device 200 and cloud system 400 recalibrate and/or adjust investments in response to user input. For example, prior to presenting user interface 300F, user interface device 211 may detect input that investment mapping module 244 determines corresponds to a request to rebalance one or more investments. User interface device 211 may further detect input that investment mapping module 244 determines corresponds to a request to modify one or more investments. Investment mapping module 244 may cause communication unit 212 to send a signal over network 110.

Communication unit 412 of cloud system 400 may detect input that account management module 442 determines corresponds to a request to rebalance one or more investments and/or modify one or more investments.

Account management module 442 may determine that due to differing investment performance for various investment sectors (or due to other reasons), the asset allocation originally chosen when path 360 was initiated has changed. Account management module 442 may interact with analytics module 444, and adjust the asset allocation associated with portfolio composition icon 385 of FIG. 4A. Account management module 442 may, alternatively or in addition, determine that the authenticated user at computing device 200 wishes to modify the investment associated with path 360 so that an investment corresponding to an airplane mode of travel is taken from Las Vegas 315 to Denver 324. Account management module 442 may interact with analytics module 444, and determine a modified investment starting at Las Vegas 315 on the journey to Denver 324.

Account management module 442 may cause communication unit 412 to output to network 110 information about or resulting from the updated asset allocation. Account management module 442 may, alternatively or in addition, cause communication unit 412 to output to network 110 information about or resulting from modifying the investment associated with path 360. Investment market 150 may receive the information, and initiate, modify, and/or liquidate one or more investments.

Account management module 442 may cause communication unit 412 to output to network 110 information about the changes to investments, including changes to investments corresponding to path 360. Communication unit 212 of computing device 200 may detect input that investment mapping module 244 determines corresponds to information about changes to investments. Investment mapping module 244 may cause user interface module 241 to present user interface 300F at user interface device 211, as illustrated in FIG. 4B.

FIG. 4B illustrates portfolio composition icon 386 after performing an investment reallocation for the investment associated with path 360 and vehicle icon 380. In the example shown in FIG. 4B, the pie chart of portfolio composition icon 386 represents an updated allocation. Also, future path 360B of FIG. 4B represents a new updated future path 360C and updated vehicle icon 384, corresponding to a new mode of travel starting from Las Vegas 315. This new mode of travel may correspond to a modified or different investment determined and/or initiated by cloud system 400.

Recalibration may be performed at any time, and need not wait until a scheduled recalibration. For example, there may be many intermediate points along path 360, and each intermediate point may be an opportunity to recalibrate investments, make additional investments, rebalance a portfolio, and/or modify or update an investment plan or algorithm that translates into a different investment choice or plan. Computing device 200 may detect input at any time that it determines corresponds to a proposed recalibration, investment modification, or new investment. Computing device 200 may appropriately update user interface 300H to correspond to the detected input. For example, the path illustrated by user interface 300H may change, the vehicle may change, and/or the speed of the vehicle may change. Accordingly, the path may be dynamic, and subject to change by many variables and by user input.

Figure 5:
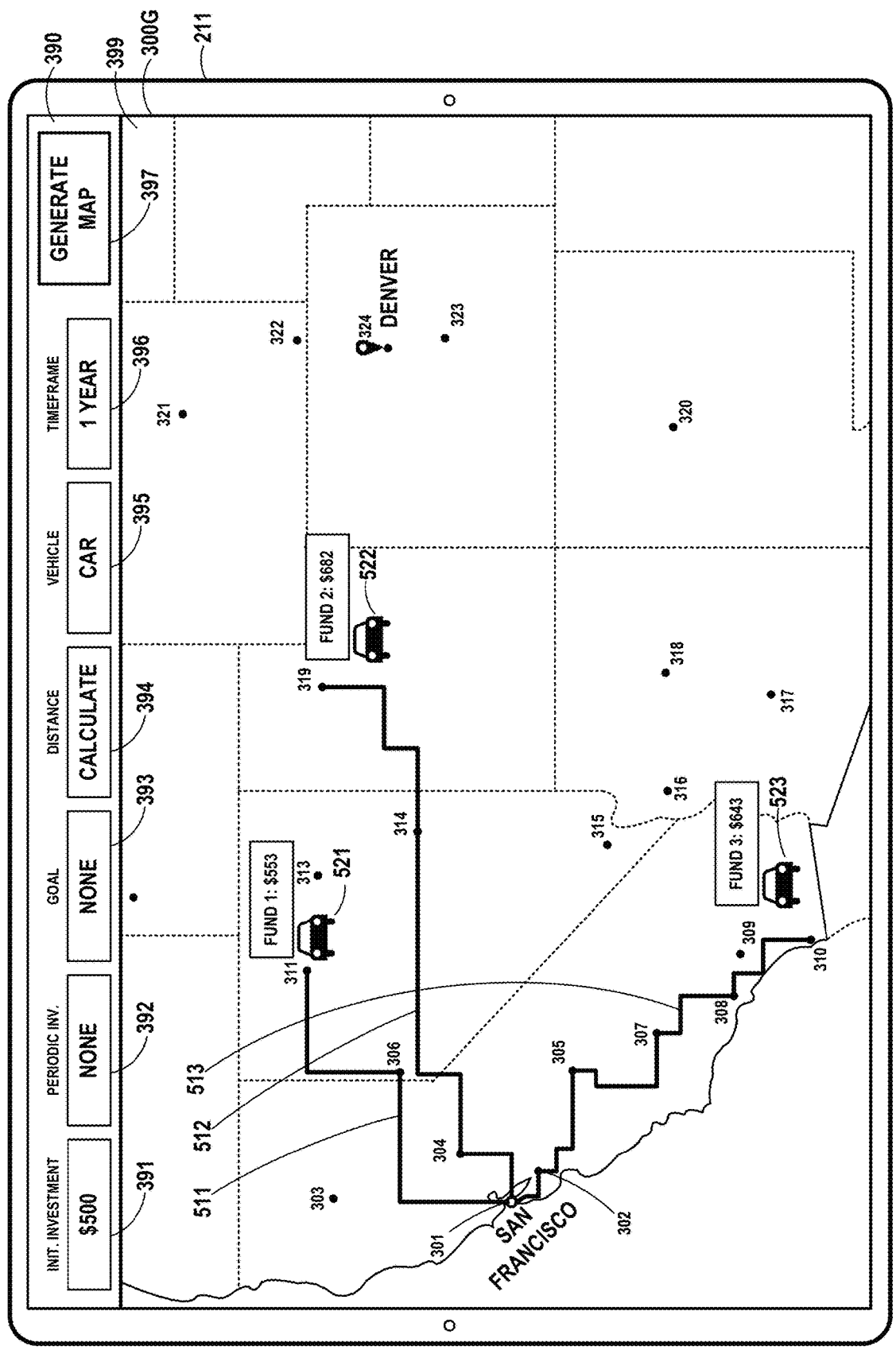
FIG. 5 is a conceptual diagram illustrating an example graphical user interface of an example computing device that is configured to estimate investment results in accordance with one or more aspects of the present disclosure.

Further, the speed of the vehicle may serve as an important attribute of an investment that is intended to reach a financial goal. One vehicle may have a different risk profile than another; a vehicle traveling at 60 miles per hour towards a destination may have a different outcome than one travelling at 90 miles per hour. The faster vehicle may get to the destination much quicker in some cases, but there may be a higher risk of the faster vehicle encountering trouble that results in not reaching the destination at all. Different vehicle speeds may be appropriately represented by maps such as those illustrated by user interfaces 300 herein, and each may provide a different view or perspective of investment choices FIG. 5 is a conceptual diagram illustrating an example graphical user interface of an example computing device that is configured to estimate investment results in accordance with one or more aspects of the present disclosure. The graphical user interface presented at user interface device 211 of FIG. 5 may correspond to a graphical user interface output by user interface device 211 of FIG. 2. One or more aspects of FIG. 5 may be described below within the context of computing device 200 of FIG. 2. FIG. 5 illustrates an example graphical user interface; many other examples of graphical user interfaces may be presented, used, or implemented in other examples, instances, or implementations.

In FIG. 5, user interface 300G illustrates predicted investment results in terms of travel distances on a map. For example, prior to presenting user interface 300G at user interface device 211, computing device 200 may detect input that it determines corresponds to one or more travel options, specified as constraints or parameters. For instance, computing device 200 may detect input at or near where user interface device 211 presents initial investment field 391, and computing device 200 may determine that the input corresponds to an initial investment of $500. Computing device 200 may detect input at or near where user interface device 211 presents vehicle field 395, and computing device 200 may determine that the user seeks to use a car as an investment vehicle. Computing device 200 may detect input at or near where user interface device 211 presents timeframe field 396, and computing device 200 may determine that the user's investment timeframe is one year. Computing device 200 may detect input at or near where user interface device 211 presents distance field 394, and computing device 200 may determine that the user seeks to determine how far an investment of $500 will take the user according to the specified constraints.

Computing device 200 may detect input corresponding to selection of generate map button 397, and may send information to cloud system 400 over network 110. Cloud system 400 may receive the information and determine that the information includes one or more investment parameters. Analytics module 444 of cloud system 400 may determine, based on the investment parameters, one or more investments. Cloud system 400 may send information over network 110 to computing device 200. Computing device 200 may receive the information and cause user interface 300G to be presented at user interface device 211.

User interface 300G illustrates three investment options (path 511, path 512, and path 513) consistent with the parameters specified by the user in input area 390. In path 511, corresponding to a first investment option, the investment journey starts at San Francisco 301 and travels to Winnemucca 311 by car (passing through Reno 306). The resulting distance corresponds to $553. In path 512, corresponding to a second investment option, the investment journey starts at San Francisco 301 and travels to Salt Lake City 319 by car (passing through Sacramento 304 and Ely 314). The resulting distance for this second investment option corresponds to $682. In path 513, corresponding to the third investment option, the investment journey also starts at San Francisco 301, but travels to San Diego 310 by car (this investment passes through San Jose 302, Fresno 305, Bakersfield 307, and Los Angeles 308). Each of the investment options are presented in terms of distances expected to be traveled, as determined by analytics module 444 of cloud system 400. Presenting investment results in the manner illustrated in FIG. 5 may enable an investor to make appropriate and effective investment decisions.

Figure 6:
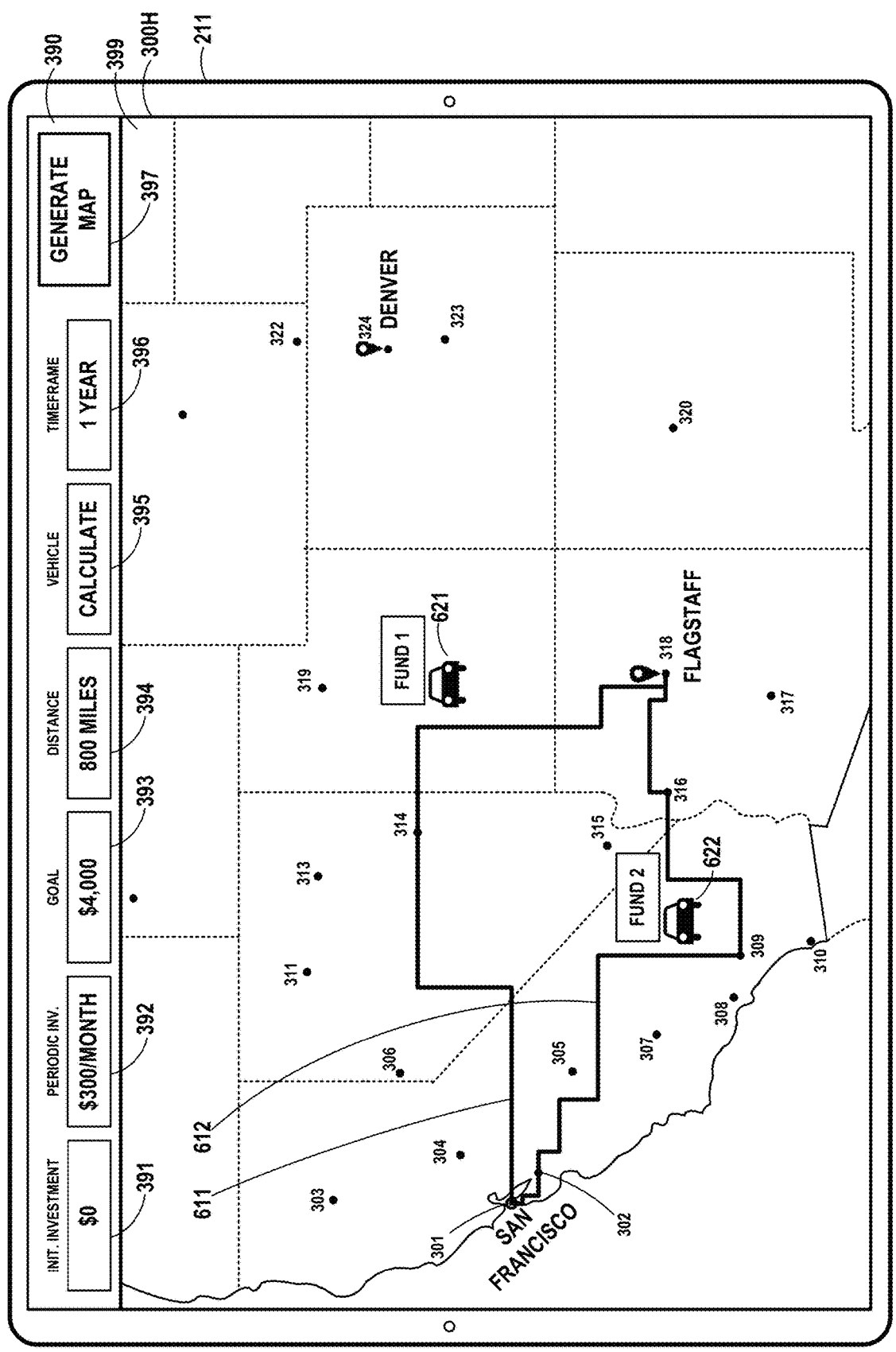
FIG. 6 is a conceptual diagram illustrating an example graphical user interface of an example computing device that is configured to select vehicles for achieving an investment goal in accordance with one or more aspects of the present disclosure.

FIG. 6 is a conceptual diagram illustrating an example graphical user interface of an example computing device that is configured to select vehicles for achieving an investment goal in accordance with one or more aspects of the present disclosure. The graphical user interface presented at user interface device 211 of FIG. 6 may correspond to a graphical user interface output by user interface device 211 of FIG. 2. One or more aspects of FIG. 6 may be described below within the context of computing device 200 of FIG. 2. FIG. 6 illustrates an example graphical user interface; many other examples of graphical user interfaces may be presented, used, or implemented in other examples, instances, or implementations.

In FIG. 6, user interface 300H illustrates possible investment options for reaching Flagstaff 318 from San Francisco 301 within a given timeframe. In this example, user interface 300H presents vehicle options for achieving this goal. For example, prior to presenting user interface 300H, computing device 200 may detect input that it determines corresponds to one or more travel options, specified as constraints or parameters. For instance, computing device 200 may detect input that corresponds to an initial investment of $0 (initial investment field 391), a periodic investment of $300/month (periodic investment field 392), a goal investment of $4,000 (goal field 393), and a distance of 800 miles (distance field 394, corresponding to a journey from San Francisco 301 to Flagstaff 318). Computing device 200 may transmit information corresponding to these parameters over network 110. Cloud system 400 may receive the information and determine that the information includes one or more investment parameters. Analytics module 444 of cloud system 400 may determine, based on the investment parameters, one or more investments that satisfy the constraints or parameters and reach the investment goal. Cloud system 400 may send information over network 110 to computing device 200. Computing device 200 may receive the information and cause user interface 300H to be presented at user interface device 211.

User interface 300H illustrates two investment options (path 611 and path 612) consistent with the parameters or constraints specified by the user, and achieving the investment goal (goal field 393). For example, path 611 corresponds to the first investment option ("fund 1"), and is illustrated as a journey by car starting at San Francisco 301, passing through Ely 314, and arriving at Flagstaff 318. Path 612 corresponds to the second investment option ("fund 2"), and is illustrated as a journey by car starting at San Francisco 301, passing through San Jose 302, Riverside 309, and Kingman 316 before arriving at Flagstaff 318. Each of the investment options in FIG. 6 is presented in terms of alternate paths for reaching the goal destination, as determined by analytics module 444 of cloud system 400. Presenting investment results in the manner illustrated in FIG. 6 may enable an investor to better understand and compare alternate investments, and make appropriate and effective investment decisions.

In some examples, computing device 200 may detect input that it determines corresponds to an increase in the periodic investment to $500/month (field 392). If such input is detected when initiating the investment plan, computing device 200 may, in response to this input, update user interface 300H to illustrate how the path may change, how the vehicle may change, and/or how the speed of one or more vehicles may change as a result of the increased periodic investment. For example, with an increase in the periodic investment, the vehicle may be upgraded, the speed could likely increase, and the path could become easier. If such input is detected a period of time after the investment plan is initiated, computing device 200 may, in response to this input, update user interface 300H to illustrate how the remaining path, vehicle choices, and/or speed may change as a result of the increased periodic investment. Such a change increasing periodic investment amounts may again likely upgrade the vehicle, increase the speed, and/or shorten the path.

Figure 7:
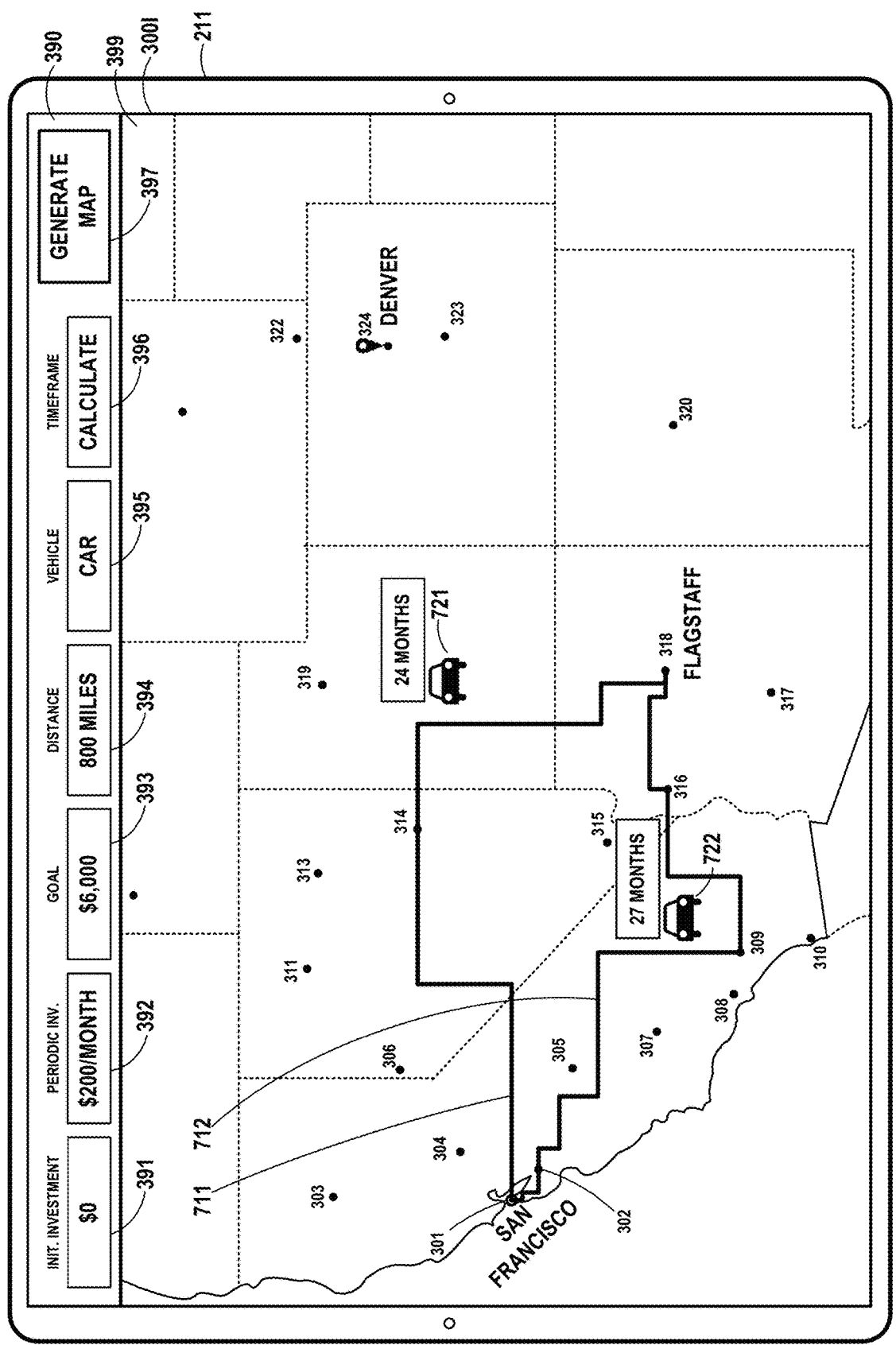
FIG. 7 is a conceptual diagram illustrating an example graphical user interface of an example computing device that is configured to determine timeframes for achieving an investment goal in accordance with one or more aspects of the present disclosure.

FIG. 7 is a conceptual diagram illustrating an example graphical user interface of an example computing device that is configured to determine timeframes for achieving an investment goal in accordance with one or more aspects of the present disclosure. The graphical user interface presented at user interface device 211 of FIG. 7 may correspond to a graphical user interface output by user interface device 211 of FIG. 2. One or more aspects of FIG. 7 may be described below within the context of computing device 200 of FIG. 2. FIG. 7 illustrates an example graphical user interface; many other examples of graphical user interfaces may be presented, used, or implemented in other examples, instances, or implementations.

In FIG. 7, user interface 300I illustrates possible investment options for reaching Flagstaff 318 from San Francisco 301 using a specific vehicle (e.g., a car). In this example, user interface 300I presents timeframe options for achieving this goal. For example, prior to presenting user interface 300I, computing device 200 may detect input that it determines corresponds to one or more travel options, specified as parameters or constraints. For instance, computing device

200 may detect input that corresponds to an initial investment of $0 (initial investment field 391), a periodic investment of $200/month (periodic investment field 392), a goal investment of $6,000 (goal field 393), and a distance of 800 miles (distance field 394, corresponding to a journey from San Francisco 301 to Flagstaff 318). Computing device 200 may transmit information corresponding to these constraints over network 110. Cloud system 400 may receive the information and determine that the information includes one or more investment constraints. Analytics module 444 of cloud system 400 may determine, based on the investment parameters or constraints, one or more investments that satisfy the constraints and reach or achieve the investment goal. Cloud system 400 may send information over network 110 to computing device 200. Computing device 200 may receive the information and cause user interface 300I to be presented at user interface device 211.

User interface 300I illustrates two investment options (path 711 and path 712), each consistent with the parameters or constraints specified by the user, and achieving the investment goal (goal field 393). For example, path 711 corresponds to the first investment option, and as is required by the constraints, involves travel by car. Path 711 is illustrated as a journey by car taking 24 months, and starting at San Francisco 301, passing through Ely 314, and arriving at Flagstaff 318. Path 712 corresponds to the second investment option, and as is required by the constraints, involves travel by car. Path 712 is illustrated as a journey by car taking 27 months that starts at San Francisco 301, and passes through San Jose 302, Riverside 309, and Kingman 316 before arriving at Flagstaff 318. Each of the investment options in FIG. 7 is presented in terms of alternative paths, by car, for reaching the goal destination, as determined by analytics module 444 of cloud system 400. As previously described, presenting investment results in terms of travel options, as illustrated in FIG. 7, may enable an investment or make effective investment decisions, and may enable to better understand and compare alternative investments.

Figure 8:
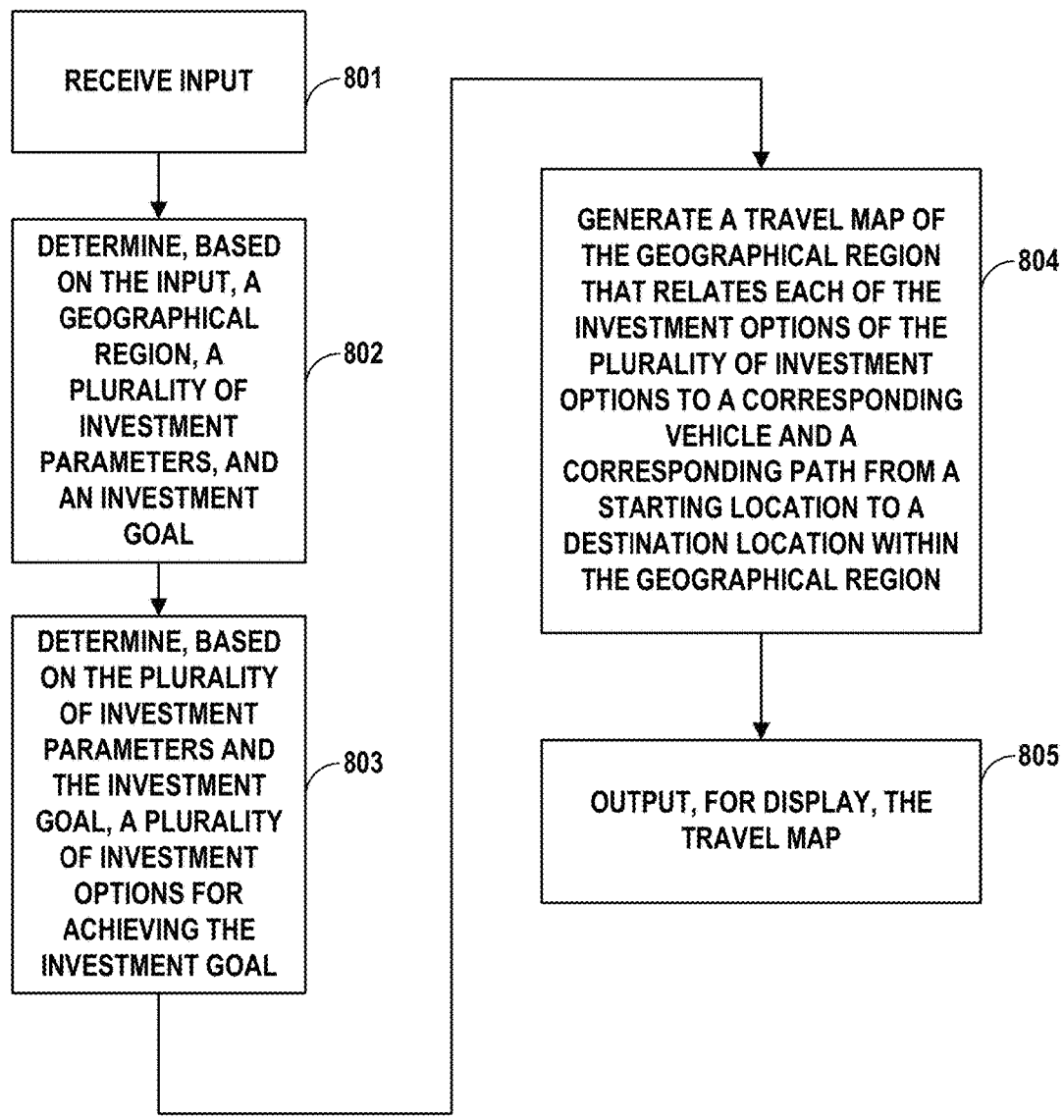
FIG. 8 is a flow diagram illustrating operations performed by an example cloud system in accordance with one or more aspects of the present disclosure.

FIG. 8 is a flow diagram illustrating operations performed by an example cloud system in accordance with one or more aspects of the present disclosure. FIG. 8 is described below within the context of cloud system 400 of FIG. 2. In other examples, operations described in FIG. 8 may be performed by one or more other components, modules, systems, or devices. Further, in other examples, operations described in connection with FIG. 8 may be merged, performed in a difference sequence, or omitted.

In the example of FIG. 8, cloud system 400 may receive input (801). For example, communication unit 412 of cloud system 400 may detect input over network 110.

Communication unit 412 of cloud system 400 may output to account management module 442 an indication of input.

Cloud system 400 may determine, based on the input, a geographical region, a plurality of investment parameters, and an investment goal (802). For example, account management module 442 of cloud system 400 may determine that the input detected by communication unit 412 corresponds to a staring investment value and a goal investment value. Account management module 442 may further determine, based on the input, that the user responsible for the input is familiar with a specific geographical region.

Cloud system 400 may determine, based on the plurality of investment parameters and the investment goal, a plurality of investment options for achieving the investment goal (803). For example, account management module 442 may output to analytics module 444 information about the investment parameters. Analytics module 444 may analyze the information and determine one or more investment options for achieving the investment goal. Analytics module 444 may output to account management module 442 information about the investment options.

Cloud system 400 may generate a travel map of the geographical region that relates each of the investment options of the plurality of investment options to a corresponding vehicle and a corresponding path from a starting location to a destination location within the geographical region (804). For example, account management module 442 may generate information sufficient to create a user interface that includes a travel map illustrating investments in terms of travel plans.

Cloud system 400 may output, for display, the travel map (805). For example, account management module 442 may cause communication unit 412 to transmit the information over network 110. Computing device 200 may receive the information, and present a user interface (e.g., FIG. 3A) that includes a travel map illustrating investments in terms of travel plans.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not identified as being performed automatically. Also, certain operations, acts, steps, or events described as being performed automatically might be alternatively not performed automatically, but rather, such operations, acts, steps, or events might be, in some examples, performed in response to input or another event.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   collecting, by a computing system, information about a user;
   determining, by the computing system and based on the collected information, a geographical area expected to be familiar to the user;
   outputting, by the computing system for presentation on a display screen, a user interface including a navigation map illustrating a plurality of travel plans within the geographical area, each travel plan corresponding to an investment option, wherein the navigation map illustrates each of the travel plans with a travel vehicle corresponding to an investment vehicle and a travel distance corresponding to an investment timeframe, wherein, for each of the plurality of travel plans, a respective travel path from a starting location to a destination location is assigned on the navigation map based on topological ordering of possible paths;
   receiving, by the computing system, an indication of input from the user interacting with the navigation map through the user interface;
   identifying, by the computing system and based on the indication of input, a selected travel plan from among the plurality of travel plans within the geographical area;
   determining, by the computing system and based on the indication of input, a selected investment option, wherein the selected investment option corresponds to the selected travel plan;
   outputting, by the computing system and to an investment market, information about the selected investment option and the user, wherein the investment market includes an aggregation of buyers and sellers of at least one of investment of financial assets, investment of financial securities, or investment of financial instruments;
   enabling, by the computing system, deployment of the selected investment option on behalf of the user;
   after enabling deployment of the investment option, determining, by the computing system, information about past performance of the selected investment option since deployment; and
   outputting, by the computing system, an updated user interface that includes an updated navigation map illustrating an updated travel plan within the geographical area, wherein the updated travel plan illustrates the selected travel path including the starting location, a current location along the selected travel path, and the destination location, wherein the current location represents the information about past performance of the selected investment option since deployment, and wherein the updated travel plan further illustrates predicted future performance of the selected investment option by indicating an updated investment timeframe to reach the destination location.

2. The method of claim 1, wherein the outputting of the updated user interface includes:
   displaying, at the current location along the selected travel path, an illustration of current asset allocation information corresponding to the selected investment option.

3. The method of claim 2, further comprising:
   receiving, by the computing system, an indication of input from the user interacting with the updated navigation map through the updated user interface;
   responsive to the indication of input from the user interacting with the updated navigation map, rebalancing assets corresponding to the selected investment option; and
   outputting, by the computing system, a further updated navigation map through the updated user interface that includes an illustration of updated asset allocation information corresponding to the selected investment option.

4. The method of claim 1, wherein the plurality of travel plans is a plurality of first tier travel plans, the method further comprising:
   identifying a plurality of second tier travel plans which represent subcategories of the selected travel plan for enabling the user to narrow down investment options, each second tier travel plan corresponding to a second tier investment option;
   wherein the outputting of the updated user interface includes illustrating each of the second tier travel plans within the geographical area.

5. The method of claim 4, wherein the selected travel plan is illustrated with a selected travel vehicle, and wherein the outputting of the updated user interface includes:
outputting the updated user interface by illustrating each of the second tier travel plans with the selected travel vehicle.

6. The method of claim 4, wherein the plurality of second tier travel plans include a first travel plan corresponding to a first investment option and a second travel plan corresponding to a second investment option, and wherein the outputting of the updated user interface includes:
presenting the first travel plan with a first travel vehicle corresponding to a first investment vehicle and a first travel distance corresponding to a first investment timeframe; and
presenting the second travel plan with a second travel vehicle corresponding to a second investment vehicle and a second travel distance corresponding to a second investment timeframe.

7. The method of claim 6, further comprising:
receiving, by the computing system, an indication of input from the user interacting with the updated navigation map;
determining, by the computing system and based on the indication of input from the user interacting with the updated navigation map, selection of the first travel plan;
responsive to the determining of the selection of the first travel plan, outputting, by the computing system and to the investment market, information about the first investment option and the user;
enabling, by the computing system, deployment of the first investment option on behalf of the user.

8. The method of claim 7,
wherein the updated travel plan includes, at the current location along the selected travel path, an illustration of current asset allocation information corresponding to the first investment option.

9. A computing system comprising a computing device including a storage device and processing circuitry, wherein the processing circuitry executes instructions in the storage device to configure the computing system to perform operations comprising:
collecting information about a user;
determining, based on the collected information, a geographical area expected to be familiar to the user;
outputting, for presentation on a display screen, a user interface including a navigation map illustrating a plurality of travel plans within the geographical area, each travel plan corresponding to an investment option, wherein the navigation map illustrates each of the travel plans with a travel vehicle corresponding to an investment vehicle and a travel distance corresponding to an investment timeframe, wherein, for each of the plurality of travel plans, a respective travel path from a starting location to a destination location is assigned on the navigation map based on topological ordering of possible paths;
receiving an indication of input from the user interacting with the navigation map through the user interface;
identifying, based on the indication of input, a selected travel plan from among the plurality of travel plans within the geographical area; and
determining, based on the indication of input, a selected investment option, wherein the selected investment option corresponds to the selected travel plan;
outputting, to an investment market, information about the selected investment option and the user, wherein the investment market includes an aggregation of buyers and sellers of at least one of investment of financial assets, investment of financial securities, or investment of financial instruments;
enabling deployment of the selected investment option on behalf of the user;
after enabling deployment of the investment option, determining information about past performance of the selected investment option since deployment; and
outputting an updated user interface that includes an updated navigation map illustrating an updated travel plan within the geographical area, wherein the updated travel plan illustrates the selected travel path including the starting location, a current location along the selected travel path, and the destination location, wherein the current location represents the information about past performance of the selected investment option since deployment, and wherein the updated travel plan further illustrates predicted future performance of the selected investment option by indicating an updated investment timeframe to reach the destination location.

10. The computing system of claim 9, wherein the outputting of the updated user interface includes:
displaying, at the current location along the selected travel path, an illustration of current asset allocation information corresponding to the selected investment option.

11. The computing system of claim 10, wherein the processing circuitry is further configured to perform operations comprising:
receiving an indication of input from the user interacting with the updated navigation map through the updated user interface;
responsive to the indication of input from the user interacting with the updated navigation map, rebalancing assets corresponding to the selected investment option; and
outputting a further updated navigation map through the updated user interface that includes an illustration of updated asset allocation information corresponding to the selected investment option.

12. The computing system of claim 9, wherein the plurality of travel plans is a plurality of first tier travel plans, and wherein the processing circuitry is further configured to perform operations comprising:
identifying a plurality of second tier travel plans which represent subcategories of the selected travel plan for enabling the user to narrow down investment options, each second tier travel plan corresponding to a second tier investment option;
wherein the outputting of the updated user interface includes illustrating each of the second tier travel plans within the geographical area.

13. The computing system of claim 12, wherein the selected travel plan is illustrated with a selected travel vehicle, and wherein the outputting of the updated user interface includes:
outputting the updated user interface by illustrating each of the second tier travel plans with the selected travel vehicle.

14. The computing system of claim 12, wherein the plurality of second tier travel plans include a first travel plan corresponding to a first investment option and a second travel plan corresponding to a second investment option, and wherein the outputting of the updated user interface includes:

presenting the first travel plan with a first travel vehicle corresponding to a first investment vehicle and a first travel distance corresponding to a first investment timeframe; and presenting the second travel plan with a second travel vehicle corresponding to a second investment vehicle and a second travel distance corresponding to a second investment timeframe.

15. The computing system of claim 14, wherein the processing circuitry is further configured to perform operations comprising:

receiving an indication of input from the user interacting with the updated navigation map;

determining, based on the indication of input from the user interacting with the updated navigation map, selection of the first travel plan;

responsive to the determining of the selection of the first travel plan, outputting, by the computing system and to the investment market, information about the first investment option and the user;

enabling deployment of the first investment option on behalf of the user.

16. The computing system of claim 15, wherein the updated travel plan includes, at the current location along the selected travel path, an illustration of current asset allocation information corresponding to the first investment option.

17. A non-transitory computer-readable storage medium comprising instructions that, when executed by processing circuitry, configure the processing circuitry of a computing system to perform operations comprising:

collecting information about a user;

determining, based on the collected information, a geographical area expected to be familiar to the user;

outputting, on a display screen, a user interface including a navigation map illustrating a plurality of travel plans within the geographical area, each travel plan corresponding to an investment option, wherein the navigation map illustrates each of the travel plans with a travel vehicle corresponding to an investment vehicle and a travel distance corresponding to an investment timeframe, wherein, for each of the plurality of travel plans, a respective travel path from a starting location to a destination location is assigned on the navigation map based on topological ordering of possible paths;

receiving an indication of input interacting from the user with the navigation map through the user interface;

identifying, based on the indication of input, a selected travel plan from among the plurality of travel plans within the geographical area; and determining, based on the indication of input, a selected investment option, wherein the selected investment option corresponds to the selected travel plan;

outputting, to an investment market, information about the selected investment option and the user, wherein the investment market includes an aggregation of buyers and sellers of at least one of investment of financial assets, investment of financial securities, or investment of financial instruments;

enabling deployment of the selected investment option on behalf of the user;

after enabling deployment of the investment option, determining information about past performance of the selected investment option since deployment; and outputting an updated user interface that includes an updated navigation map illustrating an updated travel plan within the geographical area, wherein the updated travel plan illustrates the selected travel path including the starting location, a current location along the selected travel path, and the destination location, wherein the current location represents the information about past performance of the selected investment option since deployment, and wherein the updated travel plan further illustrates predicted future performance of the selected investment option by indicating an updated investment timeframe to reach the destination location.

18. The non-transitory computer-readable storage medium of claim 17, wherein the plurality of travel plans is a plurality of first tier travel plans, and wherein the instructions, when executed, further configure the processing circuitry to perform operations comprising:

identifying a plurality of second tier travel plans which represent subcategories of the selected travel plan for enabling the user to narrow down investment options, each second tier travel plan corresponding to a second tier investment option;

wherein outputting the updated user interface includes illustrating each of the second tier travel plans within the geographical area.

* * * * *